US010104667B2

(12) United States Patent
Bo et al.

(10) Patent No.: US 10,104,667 B2
(45) Date of Patent: Oct. 16, 2018

(54) RESOURCE SCHEDULING METHOD, BASE STATION, AND USER EQUIPMENT

(71) Applicant: Huawei Technologies Co., Ltd., Shenzhen (CN)

(72) Inventors: Lin Bo, Chengdu (CN); Fan Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 15/417,029

(22) Filed: Jan. 26, 2017

(65) Prior Publication Data

US 2017/0142729 A1 May 18, 2017

Related U.S. Application Data

(63) Continuation of application No. PCT/CN2015/080158, filed on May 29, 2015.

(30) Foreign Application Priority Data

Aug. 4, 2014 (CN) .......................... 2014 1 0380567

(51) Int. Cl.
*H04W 72/04* (2009.01)
*H04L 5/00* (2006.01)
(Continued)

(52) U.S. Cl.
CPC ...... *H04W 72/0453* (2013.01); *H04B 7/0413* (2013.01); *H04L 5/0048* (2013.01); *H04W 72/1226* (2013.01)

(58) Field of Classification Search
None
See application file for complete search history.

(56) References Cited

U.S. PATENT DOCUMENTS 8,050,697 B2 11/2011 Jia et al.
2009/0307312 A1 12/2009 Ramaswamy
(Continued)

FOREIGN PATENT DOCUMENTS

CN 102377463 A 3/2012
CN 103096330 A 5/2013
(Continued)

OTHER PUBLICATIONS

"LTE-Advanced MIMO," Modern Science of Telecommunications (Dec. 12, 2011).

*Primary Examiner* — Robert C Scheibel
(74) *Attorney, Agent, or Firm* — Leydig, Voit & Mayer, Ltd.

(57) ABSTRACT

Disclosed comprises a resource scheduling method, a base station, and user equipment (UE). The method includes: receiving a scheduling request from the LE; determining a scheduling type (edge UE or non-edge UE) of the UE; scheduling a frequency resource for the UE according to the scheduling type of the UE and a frequency resource configuration of a serving cell of the UE; and sending, to the UE, scheduling information used to indicate the frequency resource scheduled for the UE, where the frequency resource configuration includes a public frequency resource and a dedicated frequency resource. Virtual multiple-input multiple-output (VMIMO) pairing is allowed on the public frequency resource, and the public frequency resource is capable of being used to schedule edge UE and non-ed UE. VMIMO pairing is not allowed on the dedicated frequency resource, and the dedicated frequency resource is capable of being used to schedule only edge UE.

16 Claims, 7 Drawing Sheets

(51) Int. Cl.
*H04B 7/0413* (2017.01)
*H04W 72/12* (2009.01)

(56) References Cited

U.S. PATENT DOCUMENTS

| | | | | |
|---|---|---|---|---|
| 2010/0128687 A1* | 5/2010 | Oteri | ............... | H04L 1/1887 |
| | | | | 370/329 |
| 2010/0197314 A1 | 8/2010 | Maaref et al. | | |
| 2011/0032813 A1* | 2/2011 | Tian | ............... | H04B 7/0452 |
| | | | | 370/203 |
| 2012/0120884 A1* | 5/2012 | Yu | ............... | H04B 7/0426 |
| | | | | 370/329 |
| 2012/0127948 A1* | 5/2012 | Chung | ............... | H04L 5/0053 |
| | | | | 370/329 |
| 2014/0133417 A1* | 5/2014 | Ariyavisitakul | ...... | H04B 7/0626 |
| | | | | 370/329 |
| 2014/0369220 A1* | 12/2014 | Fan | ............... | H04W 52/146 |
| | | | | 370/252 |

FOREIGN PATENT DOCUMENTS

| | | | |
|---|---|---|---|
| CN | 103220025 | A | 7/2013 |
| CN | 103380578 | A | 10/2013 |
| EP | 2509377 | A1 | 10/2012 |
| EP | 2733864 | A2 | 5/2014 |

* cited by examiner

201 — User equipment UE sends a scheduling request to a base station, where the base station is a control base station of a serving cell of the UE, and a scheduling type, determined by the base station, of the UE is edge UE or non-edge UE; a frequency resource configuration of the serving cell of the UE includes a public frequency resource and a dedicated frequency resource; virtual multiple-input multiple-output VMIMO pairing is allowed on the public frequency resource, and the public frequency resource can be used to schedule edge UE and non-edge UE; and VMIMO pairing is not allowed on the dedicated frequency resource, and the dedicated frequency resource can be used to schedule only edge UE 202 — The UE receives scheduling information sent by the base station, where the scheduling information is used to indicate a frequency resource scheduled by the base station for the UE

FIG. 2

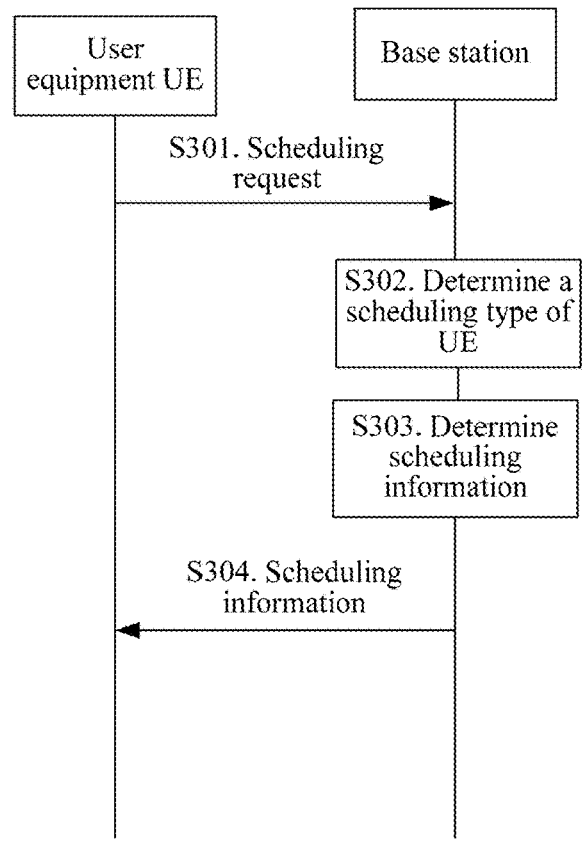

FIG. 3

RESOURCE SCHEDULING METHOD, BASE STATION, AND USER EQUIPMENT

CROSS-REFERENCE TO RELATED APPLICATIONS

This application is a continuation of International Application No. PCT/CN2015/080158, filed on May 29, 2015, which claims priority to Chinese Patent Application No. 201410380567.6, filed on Aug. 4, 2014. The disclosures of the aforementioned applications are hereby incorporated by reference in their entireties.

TECHNICAL FIELD

Embodiments of the present application relate to the field of wireless communications, and more specifically, to a resource scheduling method, a base station, and user equipment.

BACKGROUND

Key technologies such as orthogonal frequency division multiplexing (OFDM) and multiple-input multiple-output (MIMO) are introduced into a Long Term Evolution (LTE) system, so that spectrum efficiency and a data transmission rate are obviously increased, and a system capacity and coverage are also obviously expanded.

As LTE users increase, a demand for the system capacity becomes higher. The system capacity may be expanded by increasing bandwidth, but due to limited spectrum resources, how to expand the system capacity as much as possible with limited spectrum resources has become a focus of attention.

In an LTE uplink, a virtual multiple-input multiple-output (VMIMO) technology may be used to pair multiple users and transmit data of the multiple users on one time-frequency resource, thereby obviously improving a cell throughput without increasing bandwidth.

However, after the VMIMO technology is used, powers for the paired users are superimposed, which obviously increases inter-cell interference, and as a quantity of paired layers increases, a quantity of interference sources increases, which finally reduce an interference suppression effect of a receiver. As a result, a throughput and performance of edge user equipment (UE) in a VMIMO system decline significantly, and as the quantity of paired layers increases, the performance of the edge UE declines more significantly.

Therefore, how to improve a throughput and performance of edge UE with as little VMIMO system capacity loss as possible is a problem to be resolved.

SUMMARY

Embodiments of the present application provide a resource scheduling method, a base station, and user equipment, so as to improve a throughput and performance of edge UE in a VMIMO system.

According to a first aspect, a resource scheduling method is provided, including: receiving, by a base station, a scheduling request from user equipment UE; determining, by the base station, a scheduling type of the UE, where the scheduling type is edge UE or non-edge UE; scheduling, by the base station, a frequency resource for the UE according to the scheduling type of the UE and a frequency resource configuration of a serving cell of the UE; and sending, by the base station, scheduling information to the UE, where the scheduling information is used to indicate the frequency resource scheduled by the base station for the UE; the frequency resource configuration of the serving cell of the UE includes a public frequency resource and a dedicated frequency resource; virtual multiple-input multiple-output VMIMO pairing is allowed on the public frequency resource, and the public frequency resource is capable of being used to schedule edge UE and non-edge UE; and VMIMO pairing is not allowed on the dedicated frequency resource, and the dedicated frequency resource is capable of being used to schedule only edge UE.

With reference to the first aspect, in a first implementation manner of the first aspect, the scheduling, by the base station, a frequency resource for the UE according to the scheduling type of the UE and a frequency resource configuration of a serving cell of the UE includes: when the UE is non-edge UE, scheduling the frequency resource for the UE only on the public frequency resource.

With reference to the first aspect and the foregoing implementation manner, in a second implementation manner of the first aspect, the scheduling, by the base station, a frequency resource for the UE according to the scheduling type of the UE and a frequency resource configuration of a serving cell of the UE includes: when the UE is edge UE, between the dedicated frequency resource and the public frequency resource, scheduling the frequency resource for the UE preferentially on the dedicated frequency resource.

With reference to the first aspect and the foregoing implementation manners, in a third implementation manner of the first aspect, the scheduling the frequency resource for the UE preferentially on the dedicated frequency resource includes: preferentially selecting, from unscheduled frequency resources of the dedicated frequency resource, a frequency resource with a largest frequency spacing from the public frequency resource.

With reference to the first aspect and the foregoing implementation manner, in a fourth implementation manner of the first aspect, the scheduling, by the base station, a frequency resource for the UE according to the scheduling type of the UE and a frequency resource configuration of a serving cell of the UE includes: when the UE is edge UE, preferentially selecting a frequency resource with a maximum signal to interference plus noise ratio SINR from unscheduled resources of the public frequency resource and the dedicated frequency resource.

With reference to the first aspect and the foregoing implementation manners, in a fifth implementation manner of the first aspect, the determining, by the base station, a scheduling type of the UE includes: receiving an uplink signal from the UE, and determining a signal to interference plus noise ratio SINR of the UE; and when the SINR of the UE is less than a first preset threshold, determining that the UE is edge UE; or when the SINR of the target UE is greater than a first preset threshold, determining that the UE is non-edge UE.

With reference to the first aspect and the foregoing implementation manners, in a sixth implementation manner of the first aspect, the determining, by the base station, a scheduling type of the UE includes: receiving a reference signal received power RSRP difference from the UE, where the RSRP difference includes a difference between a receive power of a downlink reference signal in the serving cell of the UE and a receive power of a downlink reference signal in a neighboring cell of the serving cell of the UE; and when an absolute value of the RSRP difference is less than a first preset threshold, determining that the UE is edge UE; or when an absolute value of the RSRP difference is greater than a first preset threshold, determining that the UE is non-edge UE.

With reference to the first aspect and the foregoing implementation manners, in a seventh implementation manner of the first aspect, the dedicated frequency resource is a continuous frequency segment pre-configured in a frequency resource of the serving cell of the UE, and the pre-configured continuous frequency segment includes a highest frequency or a lowest frequency in the frequency resource of the serving cell of the UE.

With reference to the first aspect and the foregoing implementation manners, in an eighth implementation manner of the first aspect, the method further includes: when the SINR of the UE or the absolute value of the RSRP difference is less than a second preset threshold, determining, by the base station, that the UE is protected UE; and the scheduling, by the base station, a frequency resource for the UE according to the scheduling type of the UE and a frequency resource configuration of a serving cell of the UE includes: when the UE is protected UE, scheduling the frequency resource for the UE only on the dedicated frequency resource.

According to a second aspect, a resource scheduling method is provided, including: sending, by user equipment UE, a scheduling request to a base station, where the base station is a control base station of a serving cell of the UE, and a scheduling type, determined by the base station, of the UE is edge UE or non-edge UE; a frequency resource configuration of the serving cell of the UE includes a public frequency resource and a dedicated frequency resource; virtual multiple-input multiple-output VMIMO pairing is allowed on the public frequency resource, and the public frequency resource is capable of being used to schedule edge UE and non-edge UE; and VMIMO pairing is not allowed on the dedicated frequency resource, and the dedicated frequency resource is capable of being used to schedule only edge UE; and receiving, by the UE, scheduling information from the base station, where the scheduling information is used to indicate a frequency resource scheduled by the base station for the UE.

With reference to the second aspect, in a first implementation manner of the second aspect, when the scheduling type, determined by the base station, of the UE is non-edge UE, the frequency resource indicated by the scheduling information includes only some or all unscheduled resources of the public frequency resource.

With reference to the second aspect and the foregoing implementation manner, in a second implementation manner of the second aspect, when the scheduling type, determined by the base station, of the UE is edge UE, the frequency resource indicated by the scheduling information includes only some or all unscheduled resources of the dedicated frequency resource; or the frequency resource indicated by the scheduling information includes all unscheduled resources of the dedicated frequency resource and some or all unscheduled resources of the public frequency resource.

With reference to the second aspect and the foregoing implementation manner, in a third implementation manner of the second aspect, when the frequency resource indicated by the scheduling information includes only some unscheduled resources of the dedicated frequency resource, the frequency resource indicated by the scheduling information includes: a frequency resource, in the unscheduled frequency resources of the dedicated frequency resource, with a largest frequency spacing from the public frequency resource.

With reference to the second aspect and the foregoing implementation manners, in a fourth implementation manner of the second aspect, when the scheduling type, determined by the base station, of the UE is edge UE, the frequency resource indicated by the scheduling information includes: a frequency resource with a maximum signal to interference plus noise ratio SINR in unscheduled resources of the public frequency resource and the dedicated frequency resource.

With reference to the second aspect and the foregoing implementation manners, in a fifth implementation manner of the second aspect, the method further includes:

sending an uplink reference signal to the base station, where the uplink reference signal is used by the base station to determine a signal to interference plus noise ratio SINR of the UE; or sending a reference signal received power RSRP difference to the base station, where the RSRP difference includes a difference between a receive power of a downlink reference signal in the serving cell of the UE and a receive power of a downlink reference signal in a neighboring cell of the serving cell of the UE, where the signal to interference plus noise ratio SINR of the UE or the RSRP difference is used by the base station to determine that the UE is edge UE or non-edge UE.

With reference to the second aspect and the foregoing implementation manners, in a sixth implementation manner of the second aspect, the dedicated frequency resource is a continuous frequency segment pre-configured in a frequency resource of the serving cell of the UE, and the pre-configured continuous frequency segment includes a highest frequency or a lowest frequency in the frequency resource of the serving cell of the UE.

According to a third aspect, a base station is provided, including: a receiving unit, configured to receive a scheduling request from user equipment UE; a processing unit, configured to determine a scheduling type of the UE, where the scheduling type is edge UE or non-edge UE, and the processing unit schedules a frequency resource for the UE according to the scheduling type of the UE and a frequency resource configuration of a serving cell of the UE; and a sending unit, configured to send scheduling information to the UE, where the scheduling information is used to indicate the frequency resource scheduled by the base station for the UE; the frequency resource configuration of the serving cell of the UE includes a public frequency resource and a dedicated frequency resource; virtual multiple-input multiple-output VMIMO pairing is allowed on the public frequency resource, and the public frequency resource is capable of being used to schedule edge UE and non-edge UE; and VMIMO pairing is not allowed on the dedicated frequency resource, and the dedicated frequency resource is capable of being used to schedule only edge UE.

With reference to the third aspect, in a first implementation manner of the third aspect, the processing unit is specifically configured to: when the UE is non-edge UE, schedule the frequency resource for the UE only on the public frequency resource.

With reference to the third aspect and the foregoing implementation manner, in a second implementation manner of the third aspect, the processing unit is specifically configured to: when the UE is edge UE, between the dedicated frequency resource and the public frequency resource, schedule the frequency resource for the UE preferentially on the dedicated frequency resource.

With reference to the third aspect and the foregoing implementation manners, in a third implementation manner of the third aspect, the processing unit is specifically configured to: preferentially select, from unscheduled frequency resources of the dedicated frequency resource, a frequency resource with a largest frequency spacing from the public frequency resource.

With reference to the third aspect and the foregoing implementation manner, in a fourth implementation manner of the third aspect, the processing unit is specifically configured to: when the UE is edge UE, preferentially select a frequency resource with a maximum signal to interference plus noise ratio SINR from unscheduled resources of the public frequency resource and the dedicated frequency resource.

With reference to the third aspect and the foregoing implementation manners, in a fifth implementation manner of the third aspect, the processing unit is specifically configured to: receive, by using the receiving unit, an uplink signal from the UE, and determine a signal to interference plus noise ratio SINR of the UE; and when the SINR of the UE is less than a first preset threshold, determine that the UE is edge UE; or when the SINR of the target UE is greater than a first preset threshold, determine that the UE is non-edge UE.

With reference to the third aspect and the foregoing implementation manners, in a sixth implementation manner of the third aspect, the processing unit is specifically configured to: receive, by using the receiving unit, a reference signal received power RSRP difference from the UE, where the RSRP difference includes a difference between a receive power of a downlink reference signal in the serving cell of the UE and a receive power of a downlink reference signal in a neighboring cell of the serving cell of the UE; and when an absolute value of the RSRP difference is less than a first preset threshold, determine that the UE is edge UE; or when an absolute value of the RSRP difference is greater than a first preset threshold, determine that the UE is non-edge UE.

With reference to the third aspect and the foregoing implementation manners, in a seventh implementation manner of the third aspect, the dedicated frequency resource is a continuous frequency segment pre-configured in a frequency resource of the serving cell of the UE, and the pre-configured continuous frequency segment includes a highest frequency or a lowest frequency in the frequency resource of the serving cell of the UE.

According to a fourth aspect, user equipment UE is provided, including: a sending unit, configured to send a scheduling request to a base station, where the base station is a control base station of a serving cell of the UE, and a scheduling type, determined by the base station, of the UE is edge UE or non-edge UE; a frequency resource configuration of the serving cell of the UE includes a public frequency resource and a dedicated frequency resource; virtual multiple-input multiple-output VMIMO pairing is allowed on the public frequency resource, and the public frequency resource is capable of being used to schedule edge UE and non-edge UE; and VMIMO pairing is not allowed on the dedicated frequency resource, and the dedicated frequency resource is capable of being used to schedule only edge UE; and a receiving unit, configured to receive scheduling information from the base station, where the scheduling information is used to indicate a frequency resource scheduled by the base station for the UE.

With reference to the fourth aspect, in a first implementation manner of the fourth aspect, when the scheduling type, determined by the base station, of the UE is non-edge UE, the frequency resource indicated by the scheduling information includes only some or all unscheduled resources of the public frequency resource.

With reference to the fourth aspect and the foregoing implementation manner, in a second implementation manner of the fourth aspect, when the scheduling type, determined by the base station, of the UE is edge UE, the frequency resource indicated by the scheduling information includes only some or all unscheduled resources of the dedicated frequency resource; or the frequency resource indicated by the scheduling information includes all unscheduled resources of the dedicated frequency resource and some or all unscheduled resources of the public frequency resource.

With reference to the fourth aspect and the foregoing implementation manners, in a third implementation manner of the fourth aspect, when the frequency resource indicated by the scheduling information includes only some unscheduled resources of the dedicated frequency resource, the frequency resource indicated by the scheduling information includes: a frequency resource, in the unscheduled frequency resources of the dedicated frequency resource, with a largest frequency spacing from the public frequency resource.

With reference to the fourth aspect and the foregoing implementation manner, in a fourth implementation manner of the fourth aspect, when the scheduling type, determined by the base station, of the UE is edge UE, the frequency resource indicated by the scheduling information includes: a frequency resource with a maximum signal to interference plus noise ratio SINR in unscheduled resources of the public frequency resource and the dedicated frequency resource.

With reference to the fourth aspect and the foregoing implementation manners, in a fifth implementation manner of the fourth aspect, the sending unit is further configured to: send an uplink reference signal to the base station, where the uplink reference signal is used by the base station to determine a signal to interference plus noise ratio SINR of the UE; or send a reference signal received power RSRP difference to the base station, where the RSRP difference includes a difference between a receive power of a downlink reference signal in the serving cell of the UE and a receive power of a downlink reference signal in a neighboring cell of the serving cell of the UE, where the signal to interference plus noise ratio SINR of the UE or the RSRP difference is used by the base station to determine that the UE is edge UE or non-edge UE.

With reference to the fourth aspect and the foregoing implementation manners, in a sixth implementation manner of the fourth aspect, the dedicated frequency resource is a continuous frequency segment pre-configured in a frequency resource of the serving cell of the UE, and the pre-configured continuous frequency segment includes a highest frequency or a lowest frequency in the frequency resource of the serving cell of the UE.

According to the embodiments of the present application, it is determined that a scheduling type of UE is edge UE or non-edge UE, and a resource is scheduled for the UE according to the scheduling type of the UE and a frequency resource configuration of a serving cell of the UE; therefore, edge UE is preferentially scheduled on a configured dedicated frequency resource, and VMIMO pairing is not performed on the edge UE scheduled on the dedicated frequency resource, thereby improving a throughput and performance of the edge UE while a throughput of an entire VMIMO system is ensured.

BRIEF DESCRIPTION OF DRAWINGS

To describe the technical solutions in the embodiments of the present application more clearly, the following briefly introduces the accompanying drawings required for describing the embodiments of the present application. Apparently, the accompanying drawings in the following description show only some embodiments of the present application, and a person of ordinary skill in the art may still derive other drawings from these accompanying drawings without creative efforts.

FIG. 2 is a flowchart of a resource scheduling method according to an embodiment of the present application;

FIG. 3 is an interaction diagram of a resource scheduling method according to an embodiment of the present application;

DESCRIPTION OF EMBODIMENTS

Figure 1:
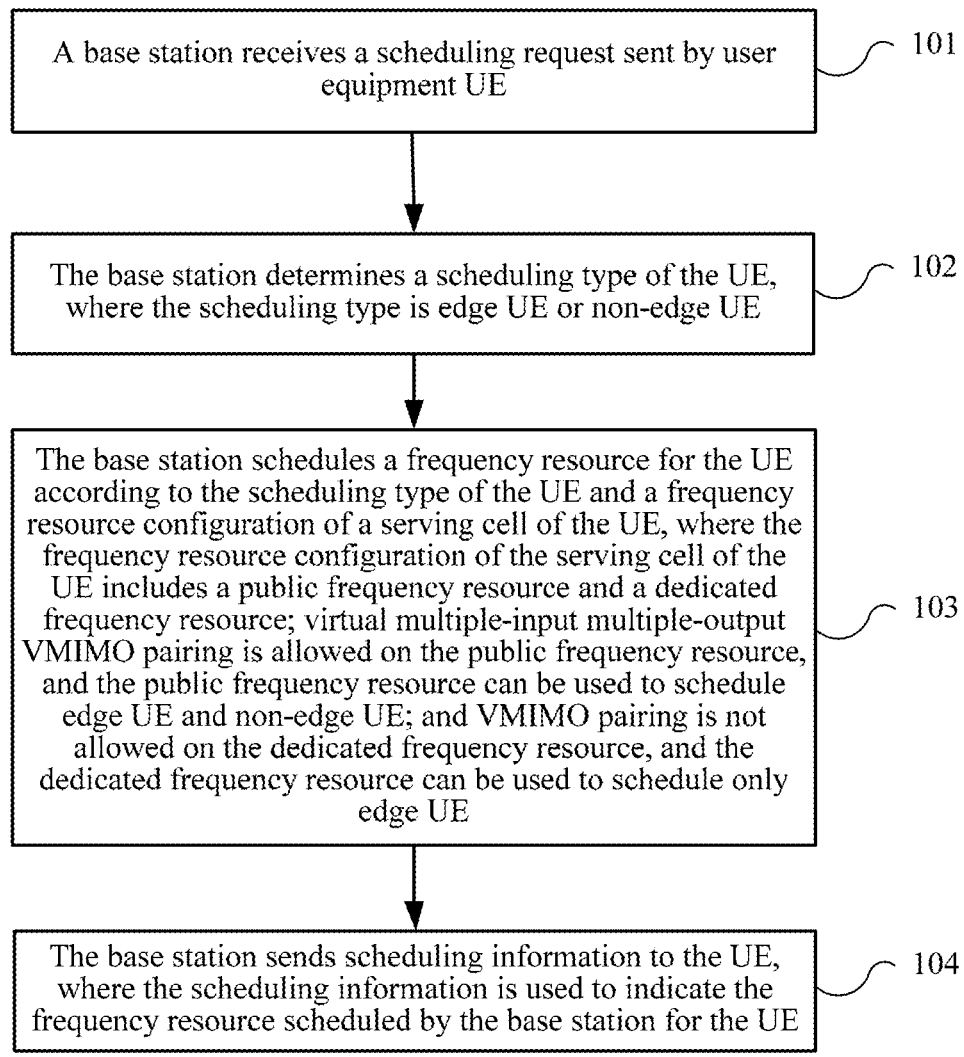
FIG. 1 is a flowchart of a resource scheduling method according to an embodiment of the present application.

The following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

The technical solutions of the present application may be applied to various communications systems, such as: a Global System for Mobile Communications (GSM) system, a Code Division Multiple Access (CDMA) system, a Wideband Code Division Multiple Access (WCDMA) system, a general packet radio service (GPRS) system, and a Long Term Evolution (LTE) system.

User equipment (UE), which may also be referred to as a mobile terminal, mobile user equipment, or the like, may communicate with one or more core networks by using a radio access network (RAN). The user equipment may be a mobile terminal such as a mobile phone (or referred to as a "cellular" phone), or a computer embedded with a mobile terminal. For example, the user equipment may be a portable, pocket-sized, handheld, computer built-in, or in-vehicle mobile apparatus, which exchanges voice and/or data with the radio access network.

A base station may be a base station (or Base Transceiver Station (BTS)) in GSM or CDMA, may be a base station (NodeB) in WCDMA, or may be an evolved NodeB (eNB, or e-NodeB, evolutional Node B) in LTE, which is not limited in the present application.

As a key technology for implementing LTE, a MIMO technology can obviously improve a system capacity and spectrum efficiency, and can well resolve a situation of radio resource shortage. In an actual mobile communications system, relatively few limitations are imposed on a base station side, multiple transmit and receive antennas may be used, and isolation between the antennas is relatively good. Therefore, an advantage of the MIMO technology can be fully exploited in a downlink. However, on a user side, if multiple antennas are configured for a terminal device, on one hand, the terminal device is limited by factors such as a volume, a battery life, and radiation of the terminal device; on the other hand, each antenna suffers a significant change in large-scale fading, and isolation between the antennas is relatively poor. Considering such a situation, the advantage of the MIMO technology generally cannot be fully used in an uplink. By using a VMIMO technology, multiple users are allowed to share respective antennas with each other, so as to constitute a virtual communications system with multiple transmit antennas and multiple receive antennas. Even if a user has only one antenna, main MIMO functions can be implemented during information transmission provided that effective cooperation is performed.

According to the VMIMO technology, different users are selected and paired as one group by using a specified scheduling mechanism according to a particular rule, to constitute a virtual multiple-antenna array that shares a time-frequency resource. Data is sent on one time-frequency resource by using the virtual multiple-antenna array, to implement spatial multiplexing of a radio signal, thereby improving a system capacity and spectrum efficiency by using a spatial multiplexing gain.

FIG. 1 is a flowchart of a resource scheduling method according to an embodiment of the present application. The method in FIG. 1 is executed by a base station.

101: The base station receives a scheduling request from user equipment UE.

102: The base station determines a scheduling type of the UE, where the scheduling type is edge UE or non-edge UE.

103: The base station schedules a frequency resource for the UE according to the scheduling type of the UE and a frequency resource configuration of a serving cell of the UE, where the frequency resource configuration of the serving cell of the UE includes a public frequency resource and a dedicated frequency resource; virtual multiple-input multiple-output VMIMO pairing is allowed on the public frequency resource, and the public frequency resource is capable of being used to schedule edge UE and non-edge UE; and VMIMO pairing is not allowed on the dedicated frequency resource, and the dedicated frequency resource is capable of being used to schedule only edge UE.

104: The base station sends scheduling information to the UE, where the scheduling information is used to indicate the frequency resource scheduled by the base station for the UE.

According to this embodiment of the present application, it is determined that a scheduling type of UE is edge UE or non-edge UE, and a resource is scheduled for the UE according to the scheduling type of the UE and a frequency resource configuration of a serving cell of the UE; therefore, edge UE is preferentially scheduled on a configured dedicated frequency resource, and VMIMO pairing is not performed on the edge UE scheduled on the dedicated frequency resource, thereby improving a throughput and performance of the edge UE while a throughput of an entire VMIMO system is ensured.

First, the UE may send the scheduling request to the base station, to request the base station to allocate an uplink time-frequency resource to the UE, so that the UE sends uplink data to the base station by using the allocated uplink time-frequency resource. Specifically, the scheduling request may be from using a physical uplink control channel (PUCCH), a physical uplink shared channel (PUSCH), or another uplink channel. The scheduling request may carry a message field used to instruct the base station to allocate a time-frequency resource to the UE. For example, the scheduling request may be an uplink scheduling request (SR), a radio access request message of the UE, or another uplink message from the UE to the base station, which is not limited in the present application.

After receiving the scheduling request from the UE, the base station may determine the scheduling type of the UE, that is, determine that the UE is edge UE or non-edge UE. It should be understood that, in a mobile communications network, one cell may provide communications services to multiple UEs at the same time, which may be understood as that a serving cell may control multiple UEs. A criterion for determining edge UE may be based on a geographical location of the UE, for example, UE at a cell edge is regarded as edge UE. Alternatively, a criterion for determining edge UE may be based on a throughput, for example, some UEs with a lowest throughput are regarded as edge UEs. There may be a constant percentage of UEs having the lowest throughput, for example, 5%, and a specific value may be determined based on a network requirement.

In addition, the base station may also determine edge UE by measuring a signal to interference plus noise ratio (SINR) on a channel between the UE and the base station, or by using a reference signal received power (RSRP) reported by the UE, or by using an RSRP difference or an SINR difference, reported by the UE, between the serving cell of the UE and a neighboring cell of the serving cell.

The frequency resource configuration of the serving cell of the UE is used to indicate that a frequency resource of the serving cell includes a dedicated frequency resource and a public frequency resource. The frequency resource configuration may be pre-configured by the base station or an upper-layer network element, and takes effect in a control unit of each cell after the base station or the cell starts working and joins in a network or after settings are adjusted. The frequency resource configuration may also be set by network maintenance personnel for the entire network, some base stations, or some cells, which is not limited in the present application.

In an example of the serving cell of the UE, according to the frequency resource configuration, the frequency resource of the serving cell may be configured as the public frequency resource and the dedicated frequency resource. The dedicated frequency resource is a dedicated frequency resource used to schedule only edge UE, and VMIMO pairing is not performed on the edge UE scheduled on the dedicated frequency resource. The public frequency resource is a public frequency resource mainly used to schedule non-edge UE, and when the dedicated frequency resource is fully occupied, the public frequency resource may also be used to schedule the edge UE; VMIMO pairing may be performed on the non-edge UE scheduled on the public frequency resource.

It should be understood that, a configuration and allocation of the frequency resource (time-frequency resource) of the serving cell are actually specific to two dimensions: time and frequency. However, for ease of description, the configuration and allocation of the time-frequency resource are described only in the frequency dimension. A person skilled in the art can understand that, during the configuration, if the time-frequency resource is configured by using resource block (RB) as a unit, both time and frequency are involved, and descriptions in the frequency dimension in the present application does not constitute any limitation thereon.

The dedicated frequency resource may be a continuous frequency resource segment, and preferably, is located at either side of the frequency resource of the serving cell of the UE, or located in the middle of the entire frequency band. Optionally, the dedicated frequency resource may also be multiple discontinuous frequency band resource segments, which is not limited in the present application. A frequency band width (a quantity of resource blocks RBs) occupied by the dedicated frequency resource and a location of the dedicated frequency resource on the frequency resource of the serving cell may be pre-configured by the base station or an upper-layer network device that controls the base station, that is, a frequency resource is configured.

There may be several frequency resource configuration manners as follows, including not only a frequency resource configuration manner for the serving cell of the UE, but also a frequency resource configuration manner for another base station or cell in the communications system.

Optionally, in an embodiment, the dedicated frequency resource is a continuous frequency segment pre-configured in the frequency resource of the serving cell of the UE, and the pre-configured continuous frequency segment includes a highest frequency or a lowest frequency in the frequency resource of the serving cell of the UE.

That is, the dedicated frequency resource may be preferably configured at one side of the frequency resource of the serving cell in a centralized manner. Specifically, in a direction from the lowest frequency of the entire frequency resource to an intermediate frequency band, a continuous frequency band may be configured as the dedicated frequency resource, and the remaining part is configured as the public frequency resource. Certainly, the configuration may also start from the highest frequency of the entire frequency resource.

With such a configuration manner, the dedicated frequency resource is centralized at one side of the entire frequency band, and has relatively few frequency borders with the public frequency resource; therefore, edge UE scheduled on the dedicated frequency resource and a user scheduled on the public frequency resource are highly isolated, so that interference on the edge UE is reduced as much as possible, which helps improve a throughput and performance of the edge UE.

Optionally, the configuration may start from an intermediate frequency of the frequency resource of the serving cell to two sides of the frequency resource, at least one continuous frequency band may be determined as the dedicated frequency resource, and the remaining frequency bands are determined as the public frequency resource. That is, for the configuration of the dedicated frequency resource, it is also feasible to determine, starting from the intermediate frequency of the entire frequency resource to the two sides, a specified quantity of RBs and configure the RBs as the dedicated frequency resource. The remaining parts at the two sides of the entire frequency resource are configured as the public frequency resource. With such a configuration manner, the dedicated frequency resource is centralized in the middle of the entire frequency band, and has relatively few frequency borders with the public frequency resource; therefore, edge UE scheduled on the dedicated frequency resource and a user scheduled on the public frequency resource are highly isolated, so that interference on the edge UE is reduced as much as possible, which helps improve a throughput and performance of the edge UE.

It should be understood that, the entire communications system may include more than one cell. The control base station of the serving cell of the UE may configure the entire frequency resource of the serving cell as a dedicated frequency resource and a public frequency resource, and a control base station of a second cell neighboring the serving cell of the UE may also configure an entire frequency resource of the second cell as a dedicated frequency resource and a public frequency resource. A configuration manner of the dedicated frequency resource and the public frequency resource of the second cell is different from that of the serving cell of the UE, that is, the dedicated frequency resources are staggered in the frequency band. The control base stations of the serving cell and the second cell may be one base station, or may be different base stations.

In an embodiment, to maximize a stagger degree of dedicated frequency resources of neighboring cells, the serving cell may configure, in a direction from the lowest frequency of the entire frequency resource to the middle of the entire frequency resource, a frequency band with a specified width as the dedicated frequency resource; the second cell may configure, in a direction from the highest frequency of the entire frequency resource to the middle of the entire frequency resource, a frequency band with a specified width as the dedicated frequency resource, and vice versa.

Optionally, there may further be a third cell. The third cell is a neighboring cell of the serving cell, and a configuration manner of a dedicated frequency resource and a public frequency resource of the third cell is the same as that of the serving cell, that is, the dedicated frequency resource of the third cell and the dedicated frequency resource of the serving cell are aligned. The control base station of the serving cell and a control base station of the third cell may be one base station, or may be different base stations.

For multiple neighboring cells, if frequency band configuration manners of the neighboring cells are the same, locations of dedicated frequency resources on the entire frequency band are aligned, and VMIMO pairing is not performed on edge UE on the aligned dedicated frequency resources. Interference on the edge UE is substantially single-input multiple-output SIMO interference, which is quite low compared with interference caused by high-order VMIMO pairing. Therefore, an objective of improving a throughput and performance of the edge UE without affecting a capacity of a VMIMO system can be achieved.

When frequency resource configurations of all neighboring cells (neighboring cells of one base station, or neighboring cells of different base stations) in the entire system are the same, that is, when dedicated frequency resources of all neighboring cells are aligned, because of high isolation between the dedicated frequency resource and the public frequency resource, interference on edge UE from UE scheduled on the public frequency resource is reduced. Therefore, the interference on the edge UE is substantially SIMO interference, and interference caused by high-order VMIMO pairing on the public frequency resource is reduced. Therefore, a throughput and performance of the edge UE can be greatly improved, and a capacity of the entire system is barely affected.

Optionally, in an embodiment, when the control base stations of the serving cell and the second cell may be one base station or different base stations, it may indicate that configuration manners of dedicated frequency resources of any two neighboring cells in the entire VMIMO network are not the same, that is, dedicated frequency resources of all neighboring cells are staggered. When dedicated frequency resources of all neighboring cells are staggered, if a public frequency resource of a current cell (for example, the serving cell) overlaps with a dedicated frequency resource of a neighboring cell (for example, the second cell), it may be limited that a quantity of VMIMO paired layers on the overlapping part of the public frequency resource of the serving cell does not exceed M, for example, M=2. Multi-layer VMIMO pairing may be performed on the remaining public frequency resources of the serving cell.

Optionally, in another embodiment, when the control base stations of the serving cell and the second cell are different base stations, and the control base stations of the serving cell and the third cell are one base station, it may indicate that configuration manners of dedicated frequency resources of multiple cells or sectors controlled by one base station are the same, that is, intra-station dedicated frequency resources are aligned, and that configuration manners of dedicated frequency resources of neighboring cells controlled by different base stations are different, that is, inter-station dedicated frequency resources are staggered.

Optionally, in an embodiment, the scheduling, by the base station, a frequency resource for the UE according to the scheduling type of the UE and a frequency resource configuration of a serving cell of the UE includes: when the UE is non-edge UE, scheduling the frequency resource for the UE only on the public frequency resource. That is, when the scheduling type, determined by the base station, of the UE is non-edge UE, the frequency resource indicated by the scheduling information includes only some or all unscheduled resources of the public frequency resource.

When the UE is determined as non-edge UE, the base station schedules the UE on the public frequency resource, and can schedule the UE only on the public frequency resource. Specifically, the base station may allocate some or all unscheduled resources of the public frequency resource to the UE. Moreover, VMIMO pairing may be performed on the UE and another non-edge UE that is scheduled on the public frequency resource. Specifically, algorithms such as a round-robin (RR) algorithm, a proportional fair (PF) algorithm, random pairing, or maximum capacity pairing may be used to pair the non-edge UEs, which is not limited in the present application. The resource scheduled by the base station for the non-edge UE may be delivered to the UE by using the scheduling information.

Optionally, in an embodiment, the scheduling, by the base station, a frequency resource for the UE according to the scheduling type of the UE and a frequency resource configuration of a serving cell of the UE includes: when the UE is edge UE, between the public frequency resource and the dedicated frequency resource, scheduling the frequency resource for the UE preferentially on the dedicated frequency resource. That is, when the scheduling type, determined by the base station, of the UE is edge UE, the frequency resource indicated by the scheduling information includes only some or all unscheduled resources of the dedicated frequency resource; or the frequency resource indicated by the scheduling information includes all unscheduled resources of the dedicated frequency resource and some or all unscheduled resources of the public frequency resource.

When the UE is determined as edge UE, the base station allocates a resource to the edge UE, and if the dedicated frequency resource includes unscheduled resources, allocates some or all unscheduled resources to the edge UE. If the dedicated frequency resource includes no unscheduled resource, that is, all dedicated frequency resources are occupied, a resource from the public frequency resource may be allocated to the edge UE. Moreover, in a case of scheduling the edge UE on the public frequency resource, VMIMO pairing is prohibited from being performed on the edge UE.

Optionally, in an embodiment, the scheduling the frequency resource for the UE preferentially on the dedicated frequency resource includes: preferentially selecting, from unscheduled frequency resources of the dedicated frequency resource, a frequency resource with a largest frequency spacing from the public frequency resource. That is, when the frequency resource indicated by the scheduling information includes only some unscheduled resources of the dedicated frequency resource, the frequency resource indicated by the scheduling information includes: a frequency resource, in the unscheduled frequency resources of the dedicated frequency resource, with a largest frequency spacing from the public frequency resource.

When the edge UE is scheduled, a resource may be scheduled for the UE according to a frequency band configuration manner, to further ensure isolation between the edge UE and the non-edge UE during scheduling. Specifically, when the dedicated frequency resource is configured at a highest-frequency side of the entire frequency band, RBs may be allocated to the edge UE starting from the highest-frequency side of the dedicated frequency resource. Correspondingly, for the non-edge UE, RBs may be allocated to the non-edge UE starting from a lowest-frequency side of the public frequency resource. Such a manner of allocating RBs starting from two sides, which are farthest away from each other, of the dedicated frequency resource and the public frequency resource can maximize isolation between the edge UE and the non-edge UE, and can further reduce interference on the edge UE, thereby further improving a throughput and performance of the edge UE.

In addition, before RBs are allocated to the edge UE, whether the dedicated frequency resource includes an unscheduled RB may be first determined. If the dedicated frequency resource includes an unscheduled RB, the edge UE is preferentially scheduled on the dedicated frequency resource, and if a quantity of unscheduled RBs is less than a quantity of RBs required by the edge UE, an RB of the public frequency resource may be allocated to the edge UE by crossing a boundary between the dedicated frequency resource and the public frequency resource, to make up for the shortage of RBs of the dedicated frequency resource. If all RBs of the dedicated frequency resource have been scheduled, RBs of the public frequency resource may be allocated to the edge UE.

Optionally, when it is determined that the dedicated frequency resource includes at least one unscheduled resource block RB, and the dedicated frequency resource includes the lowest frequency of the entire frequency resource, in a direction from the lowest frequency of the dedicated frequency resource to an intermediate frequency of the entire frequency resource, RBs of the dedicated frequency resource are allocated to the UE; or when it is determined that all RBs of the dedicated frequency resource have been scheduled, RBs of the public frequency resource are allocated to the UE.

When scheduling the edge UE, the base station may schedule a resource for the UE according to a frequency band configuration manner, to further ensure isolation between the edge UE and the non-edge UE during scheduling. Specifically, when the dedicated frequency resource is configured at a lowest-frequency side of the entire frequency band, RBs may be allocated to the edge UE starting from the lowest-frequency side of the dedicated frequency resource. Correspondingly, for the non-edge UE, RBs may be allocated to the non-edge UE starting from a highest-frequency side of the public frequency resource. Such a manner of allocating RBs starting from two sides, which are farthest away from each other, of the dedicated frequency resource and the public frequency resource can maximize isolation between the edge UE and the non-edge UE, and can further reduce interference on the edge UE, thereby further improving a throughput and performance of the edge UE.

In addition, before RBs are allocated to the edge UE, whether the dedicated frequency resource includes an unscheduled RB may be first determined. If the dedicated frequency resource includes an unscheduled RB, the edge UE is preferentially scheduled on the dedicated frequency resource, and if a quantity of unscheduled RBs is less than a quantity of RBs required by the edge UE, an RB of the public frequency resource may be allocated to the edge UE by crossing a boundary between the dedicated frequency resource and the public frequency resource, to make up for the shortage of RBs of the dedicated frequency resource. If all RBs of the dedicated frequency resource have been scheduled, RBs of the public frequency resource may be allocated to the edge UE.

Optionally, if the dedicated frequency resource is located in the middle of the entire frequency band, when scheduling the edge UE, the base station may allocate RBs to the edge UE starting from any location on the dedicated frequency resource, and when scheduling the non-edge UE, the base station preferentially allocates RBs to the non-edge UE starting from two sides of the entire frequency band, that is, a highest-frequency side and a lowest-frequency side of the public frequency resource.

Optionally, in an embodiment, the scheduling, by the base station, a frequency resource for the UE according to the scheduling type of the UE and a frequency resource configuration of a serving cell of the UE includes: when the UE is edge UE, preferentially selecting a frequency resource with a maximum signal to interference plus noise ratio SINR from unscheduled resources of the public frequency resource and the dedicated frequency resource. That is, when the scheduling type, determined by the base station, of the UE is edge UE, the frequency resource indicated by the scheduling information includes: a frequency resource with a maximum signal to interference plus noise ratio SINR in unscheduled resources of the public frequency resource and the dedicated frequency resource.

The base station may determine an SINR of each RB in the entire frequency resource (the dedicated frequency resource and the public frequency resource), and according to a quantity N of RBs required by the UE, select N RBs having a relatively large sum of SINRs and allocate the N RBs to the UE. Preferably, the N RBs are continuous RBs. That is, a frequency resource that is allocated to the UE and that is indicated by the generated scheduling information is a frequency resource with a maximum SINR in the entire frequency resource.

When RBs are selected according to the SINR to schedule the edge UE, because a better resource is preferentially allocated to edge UE with poor communication quality and strength, an anti-interference capability of the edge UE can be further improved; therefore, a throughput and performance of the edge UE are improved.

Optionally, in an embodiment, the determining, by the base station, a scheduling type of the UE includes: receiving an uplink signal from the UE, and determining a signal to interference plus noise ratio SINR of the UE; and when the SINR of the UE is less than a first preset threshold, determining that the UE is edge UE; or when the SINR of the target UE is greater than a first preset threshold, determining that the UE is non-edge UE.

Preferably, whether the UE is edge UE may be determined by measuring an SINR of the UE. The UE may send an uplink access request signal or an uplink synchronization signal to the control base station of the serving cell, so that the control base station of the serving cell determines a signal to interference plus noise ratio SINR of the UE according to the uplink access request signal or the uplink synchronization signal. Specifically, the base station may preset a first threshold, and UE whose SINR is less than the first threshold is determined as edge UE.

It should be understood that, a parameter for measurement and for determining whether the UE is edge UE is not limited to the SINR, and determining may also be performed by using parameters that can indicate UE communication quality, such as a reference signal received power RSRP, reference signal received quality RSRQ, a received signal strength indicator RSSI, and a distance between the UE and the base station. Correspondingly, the setting of the first threshold, and settings of a magnitude relationship and a determining result vary with a parameter type. For example, when a measurement parameter is an RSRP, and when a measurement result is less than the first threshold, it is determined that the UE is edge UE; or when a measurement result is greater than the first threshold, it is determined that the UE is non-edge UE. As for a case in which the measurement result is equal to the first threshold, that the UE is edge UE or non-edge UE may be preset. In addition, the parameter for determining whether the UE is edge UE may also be any combination of the foregoing several parameters, which is not limited in the present application.

Optionally, in an embodiment, the determining, by the base station, a scheduling type of the UE includes: receiving a reference signal received power RSRP difference from the UE, where the RSRP difference includes a difference between a receive power of a downlink reference signal in the serving cell of the UE and a receive power of a downlink reference signal in a neighboring cell of the serving cell of the UE; and when an absolute value of the RSRP difference is less than a first preset threshold, determining that the UE is edge UE; or when an absolute value of the RSRP difference is greater than a first preset threshold, determining that the UE is non-edge UE.

Optionally, in an embodiment, when the UE is edge UE, the method further includes: when the SINR of the UE or the absolute value of the RSRP difference is less than a second preset threshold, determining, by the base station, that the UE is protected UE. The scheduling, by the base station, a frequency resource for the UE according to the scheduling type of the UE and a frequency resource configuration of a serving cell of the UE includes: when the UE is protected UE, scheduling the frequency resource for the UE only on the dedicated frequency resource.

After the UE is determined as edge UE, whether the UE is UE that needs to be protected may further be determined, and specifically, may be determined by comparing the measured SINR of the UE or the RSRP difference with the second preset threshold. For the UE that needs to be protected, the base station disables VMIMO pairing for the UE, and restrains a quantity of RBs allocated to the UE to be no greater than a quantity of RBs of the dedicated frequency resource. In this way, it can be ensured that if the UE that needs to be protected is the first scheduled edge UE, the UE that needs to be protected may completely use the dedicated frequency resource, and be free from multiflow VMIMO interference.

Similar to the parameter for determining whether the UE is edge UE, the parameter for measurement and for determining whether the UE is UE that needs to be protected is not limited to the SINR, and determining may also be performed by using parameters that can indicate UE communication quality, such as an RSRP, RSRQ, an RSSI, and a distance between the UE and the base station. Correspondingly, the setting of the second threshold, and settings of a magnitude relationship and a determining result vary with a parameter type. For example, when a measurement parameter is an RSRP, and when a measurement result is less than the second threshold, it is determined that the UE is a user that needs to be protected; or when a measurement result is greater than the second threshold, it is determined that the UE is a user that does not need to be protected. As for a case in which the measurement result is equal to the second threshold, that the UE is a user that needs to be protected or a user that does not need to be protected may be preset. In addition, the parameter for determining whether the UE is a user that needs to be protected may also be any combination of the foregoing several parameters, which is not limited in the present application. In addition, the type of the parameter for determining whether the UE is edge UE may be the same as or different from that of the parameter for determining whether the UE is a user that needs to be protected.

The base station sends the scheduling information to the UE, where the scheduling information is used to indicate the frequency resource scheduled by the base station for the UE. Specifically, the scheduling information may carry a message field that indicates a time-frequency resource allocated by the base station to the UE, and is used to indicate the frequency resource scheduled by the base station for the UE in the foregoing embodiments. The scheduling information may be from using a physical downlink control channel (PDCCH), a physical downlink shared channel (PDSCH), or another downlink channel, which is not limited in the present application.

According to this embodiment of the present application, frequency band configuration is performed on an entire frequency resource of a cell, so that a user at a cell edge is preferentially scheduled on a configured dedicated frequency resource, and VMIMO pairing is not performed on edge UE scheduled on the dedicated frequency resource; therefore, while a throughput of an entire VMIMO system is ensured, interference from VMIMO paired users in this cell and a neighboring cell on the edge UE is reduced, thereby improving a throughput and performance of the edge UE. Moreover, the dedicated frequency resource may be configured at one side of an entire frequency band in a centralized manner, to reduce frequency borders with a public frequency resource, and further improve isolation between the edge UE on the dedicated frequency resource and a user scheduled on the public frequency resource, so that the interference on the edge UE may be reduced as much as possible. Alternatively, different frequency band configuration manners are used in neighboring cells, so that locations of dedicated frequency resources can be staggered on the entire frequency band, and interference between edge UEs of the neighboring cells is further reduced; therefore, the throughput and performance of the edge UE can be further improved.

FIG. 2 is a flowchart of a resource scheduling method according to an embodiment of the present application. The method in FIG. 2 is executed by user equipment UE.

201: The user equipment UE sends a scheduling request to a base station, where the base station is a control base station of a serving cell of the UE, and a scheduling type, determined by the base station, of the UE is edge UE or non-edge UE; a frequency resource configuration of the serving cell of the UE includes a public frequency resource and a dedicated frequency resource; virtual multiple-input multiple-output VMIMO pairing is allowed on the public frequency resource, and the public frequency resource is capable of being used to schedule edge UE and non-edge UE; and VMIMO pairing is not allowed on the dedicated frequency resource, and the dedicated frequency resource is capable of being used to schedule only edge UE.

202: The UE receives scheduling information from the base station, where the scheduling information is used to indicate a frequency resource scheduled by the base station for the UE.

According to this embodiment of the present application, frequency band configuration is performed on an entire frequency resource of a cell, so that a user at a cell edge is preferentially scheduled on a configured dedicated frequency resource, and VMIMO pairing is not performed on edge UE scheduled on the dedicated frequency resource; therefore, while a throughput of an entire VMIMO system is ensured, interference from VMIMO paired users in this cell and a neighboring cell on the edge UE is reduced, thereby improving a throughput and performance of the edge UE. Moreover, the dedicated frequency resource may be configured at one side of an entire frequency band in a centralized manner, to reduce frequency borders with a public frequency resource, and further improve isolation between the edge UE on the dedicated frequency resource and a user scheduled on the public frequency resource, so that the interference on the edge UE may be reduced as much as possible. Alternatively, different frequency band configuration manners are used in neighboring cells, so that locations of dedicated frequency resources can be staggered on the entire frequency band, and interference between edge UEs of the neighboring cells is further reduced; therefore, the throughput and performance of the edge UE can be further improved.

FIG. 3 is an interaction diagram of a resource scheduling method according to an embodiment of the present application.

S301: UE sends a scheduling request to a base station.

First, after the UE accesses a network, or when uplink data needs to be sent, or after settings are changed, the UE may send the scheduling request to the base station, to request the base station to allocate an uplink time-frequency resource to the UE, so that the UE sends the uplink data to the base station by using the allocated uplink time-frequency resource. Specifically, the scheduling request may be from using a PUCCH, a PUSCH, or another uplink channel. The scheduling request may carry a message field used to instruct the base station to allocate a time-frequency resource to the UE. For example, the scheduling request may be an SR, a radio access request message of the UE, or another uplink message from the UE to the base station, which is not limited in the present application.

S302: The base station determines a scheduling type of the UE.

After receiving the scheduling request from the UE, the base station may determine the scheduling type of the UE, that is, determine that the UE is edge UE or non-edge UE.

When the base station may determine that the UE is edge UE or non-edge UE, determining may be based on a geographical location of the UE, a throughput of the UE, quality of a channel between the UE and the base station, or the like. For example, the base station may determine whether the UE is edge UE by measuring an SINR between the UE and the base station or by using an RSRP reported by the UE, or by using an RSRP difference or an SINR difference, reported by the UE, between the serving cell of the UE and a neighboring cell of the serving cell. A parameter for measurement and for determining whether the UE is edge UE is not limited to the SINR and the RSRP, and determining may also be performed by using parameters that can indicate UE communication quality, such as reference signal received quality RSRQ, a received signal strength indicator RSSI, and a distance between the UE and the base station. Correspondingly, the setting of a first threshold, and settings of a magnitude relationship and a determining result vary with a parameter type. For example, when a measurement parameter is an RSRP, and when a measurement result is less than the first threshold, it is determined that the UE is edge UE; or when a measurement result is greater than the first threshold, it is determined that the UE is non-edge UE. As for a case in which the measurement result is equal to the first threshold, that the UE is edge UE or non-edge UE may be preset. In addition, the parameter for determining whether the UE is edge UE may also be any combination of the foregoing several parameters.

In addition, there may be some protected UEs among edge UEs, and the protected UEs may be distinguished by setting a second preset threshold. Specifically, after the UE is determined as edge UE, whether the UE is UE that needs to be protected may further be determined, and specifically, may be determined by comparing the measured SINR of the UE or the RSRP difference with the second preset threshold. For the UE that needs to be protected, the base station disables VMIMO pairing for the UE, and restrains a quantity of RBs allocated to the UE to be no greater than a quantity of RBs of the dedicated frequency resource. In this way, it can be ensured that if the UE that needs to be protected is the first scheduled edge UE, the UE that needs to be protected may completely use the dedicated frequency resource, and be free from multiflow VMIMO interference.

Similar to the parameter for determining whether the UE is edge UE, the parameter for measurement and for determining whether the UE is UE that needs to be protected is not limited to the SINR, and determining may also be performed by using parameters that can indicate UE communication quality, such as an RSRP, RSRQ, an RSSI, and a distance between the UE and the base station. Correspondingly, the setting of the second threshold, and settings of a magnitude relationship and a determining result vary with a parameter type. For example, when a measurement parameter is an RSRP, and when a measurement result is less than the second threshold, it is determined that the UE is a user that needs to be protected; or when a measurement result is greater than the second threshold, it is determined that the UE is a user that does not need to be protected. As for a case in which the measurement result is equal to the second threshold, that the UE is a user that needs to be protected or a user that does not need to be protected may be preset. In addition, the parameter for determining whether the UE is a user that needs to be protected may also be any combination of the foregoing several parameters, which is not limited in the present application. In addition, the type of the parameter for determining whether the UE is edge UE may be the same as or different from that of the parameter for determining whether the UE is a user that needs to be protected.

S303: The base station determines scheduling information according to the scheduling type of the UE and a frequency resource configuration of a serving cell.

After determining whether the UE is edge UE, the base station schedules a resource for the UE according to a particular rule. When the UE is edge UE, and the dedicated frequency resource includes an unscheduled resource, the base station preferentially allocates the unscheduled resource of the dedicated frequency resource to the edge UE. However, when the dedicated frequency resource is fully occupied, the public frequency resource may be scheduled for the UE. When the UE is non-edge UE, the UE is scheduled only on the public frequency resource. The base station may generate, according to a scheduling result, scheduling information that carries a message field indicating a video resource allocated by the base station to the UE.

S304: The base station sends the scheduling information to the UE.

The scheduling information may be from using a PDCCH, a PDSCH, or another downlink channel, which is not limited in the present application.

Figure 4:
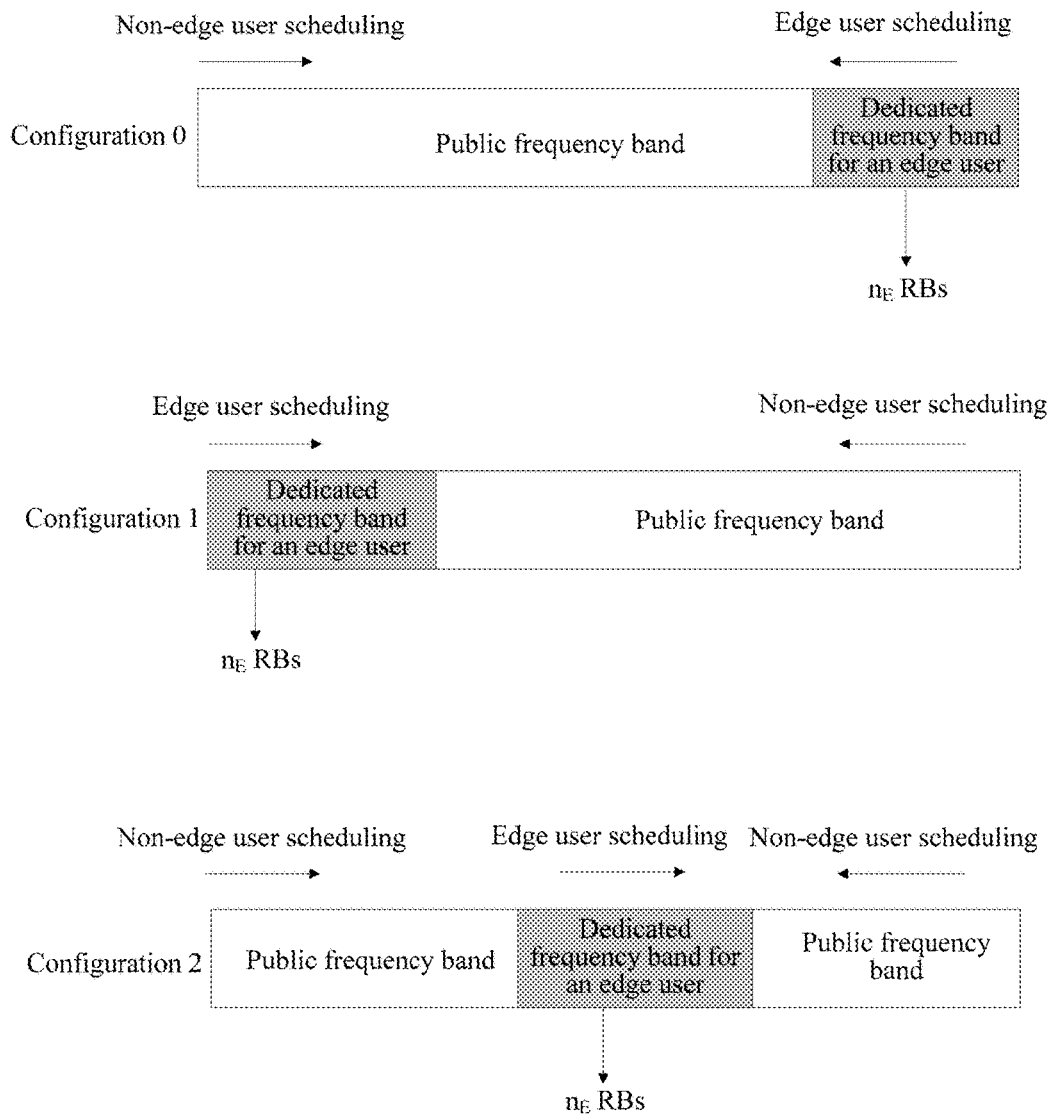
FIG. 4 is a schematic diagram of a spectrum resource configuration according to another embodiment of the present application.

FIG. 4 is a schematic diagram of a spectrum resource configuration according to another embodiment of the present application. FIG. 4 shows three preferable spectrum resource configuration manners: a configuration 0, a configuration 1, and a configuration 2.

In a frequency band shown in FIG. 4, a frequency at the left side is lower, and a frequency at the right side is higher. It should be understood that, the frequency band configuration in the figure is only an example.

A configuration manner of the configuration 0 is: in a direction from a highest frequency of an entire frequency resource to an intermediate frequency of the entire frequency resource, at least one continuous frequency band ($n_E$ RBs) is determined as a dedicated frequency resource, that is, a dedicated frequency resource for edge UE; the remaining frequency bands are determined as a public frequency resource. The quantity $n_E$ of RBs may be pre-configured by the base station, or manually configured by network maintenance personnel, which is not limited in the present application.

A configuration manner of the configuration 1 is: in a direction from a lowest frequency of an entire frequency resource to an intermediate frequency of the entire frequency resource, at least one continuous frequency band ($n_E$ RBs) is determined as a dedicated frequency resource, that is, a dedicated frequency resource for edge UE; the remaining frequency bands are determined as a public frequency resource, that is, a public frequency resource.

A configuration manner of the configuration 2 is: from an intermediate frequency of an entire frequency resource to two sides of the entire frequency resource, at least one continuous frequency band ($n_E$ RBs) is determined as a dedicated frequency resource; the remaining frequency bands are determined as a public frequency resource, that is, a public frequency resource.

For the foregoing three frequency band configuration manners, the dedicated frequency resource is centralized at one side of an entire frequency band, and has relatively few frequency borders with the public frequency resource. Therefore, edge UE scheduled on the dedicated frequency resource and a user scheduled on the public frequency resource are highly isolated, so that interference on the edge UE is reduced as much as possible, which helps improve a throughput and performance of the edge UE.

Specifically, during resource scheduling, for the configuration 0, a preferable manner is: allocating RBs to the edge UE starting from a highest-frequency side of the dedicated frequency resource, that is, the rightmost side; correspondingly, for non-edge UE, RBs may be allocated to the non-edge UE starting from a lowest-frequency side of the public frequency resource, that is, the leftmost side. Such a manner of allocating RBs starting from two sides, which are farthest away from each other, of the dedicated frequency resource and the public frequency resource can maximize isolation between the edge UE and the non-edge UE, and can further reduce interference on the edge UE.

For the configuration 1, a preferable manner is: allocating RBs to the edge UE starting from a lowest-frequency side of the dedicated frequency resource, that is, the leftmost side; correspondingly, for non-edge UE, RBs may be allocated to the non-edge UE starting from a highest-frequency side of the public frequency resource, that is, the rightmost side. Such a manner of allocating RBs starting from two sides, which are farthest away from each other, of the dedicated frequency resource and the public frequency resource can maximize isolation between the edge UE and the non-edge UE, and can further reduce interference on the edge UE.

For the configuration 2, a preferable manner is: allocating RBs to the edge UE starting from the midpoint or either side of the dedicated frequency resource; and for non-edge UE, RBs may be allocated to the non-edge UE starting from a highest-frequency side or a lowest-frequency side of the public frequency resource, that is, the rightmost side or the leftmost side. Such a manner of allocating RBs starting from two sides, which are farthest away from each other, of the dedicated frequency resource and the public frequency resource can maximize isolation between the edge UE and the non-edge UE, and can further reduce interference on the edge UE.

It should be understood that, for an entire VMIMO system, all cells may use one frequency band configuration manner, that is, any one of the foregoing three configurations. In this way, locations of dedicated frequency resources in the entire frequency band are aligned, and VMIMO pairing is not performed on edge UE on the aligned dedicated frequency resources. Interference on the edge UE is substantially single-input multiple-output SIMO interference, which is quite low compared with interference caused by high-order VMIMO pairing. Therefore, an objective of improving a throughput and performance of the edge UE without affecting a capacity of the VMIMO system can be achieved.

In addition to that dedicated frequency resources of all cells are aligned, there may further be the following several configuration solutions.

Figure 5:
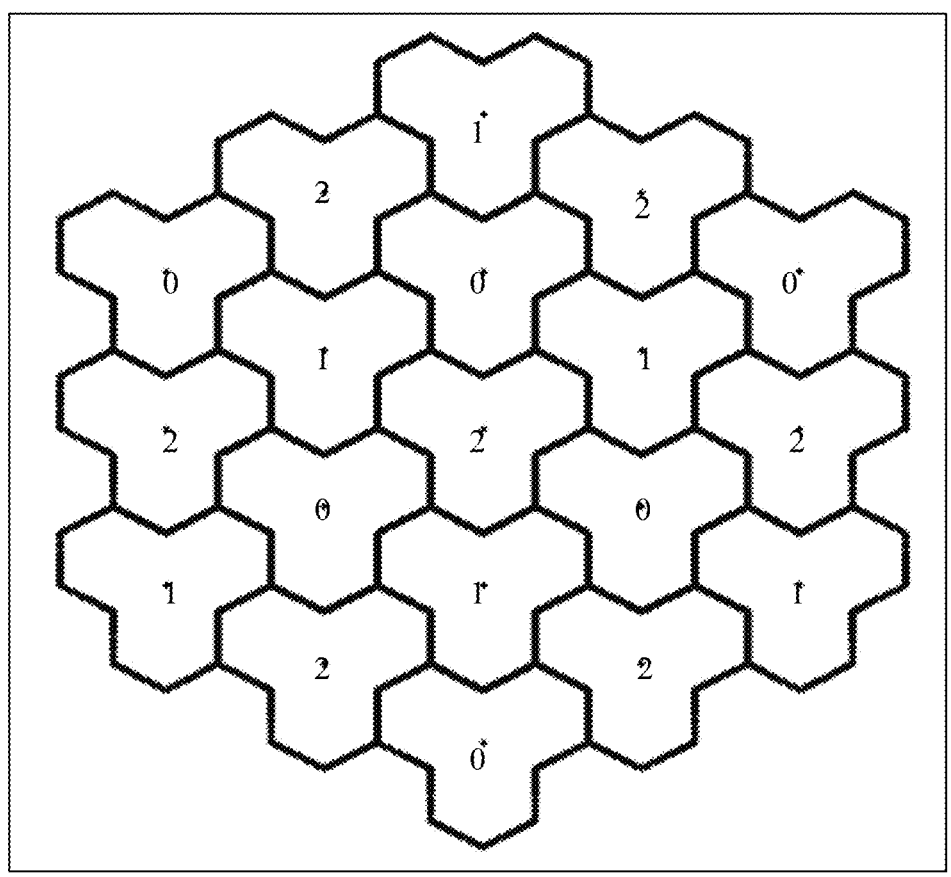
FIG. 5 is a schematic diagram of a spectrum resource configuration according to another embodiment of the present application.

FIG. 5 is a schematic diagram of a spectrum resource configuration according to another embodiment of the present application. In FIG. 5, three hexagons combined together may represent three cellular cells or three sectors controlled by one base station, and numbers 0, 1, and 2 in each base station controlled region may correspond to the three frequency band configurations in FIG. 4. As can be seen, configuration manners of dedicated frequency resources of multiple cells or sectors controlled by one base station are the same, that is, intra-station dedicated frequency resources are aligned; configuration manners of dedicated frequency resources of neighboring cells controlled by different base stations are different, that is, inter-station dedicated frequency resources are staggered. Intra-station alignment of dedicated frequency resources can reduce intra-station interference, and inter-station staggering of dedicated frequency resources can reduce inter-station interference.

Figure 6:
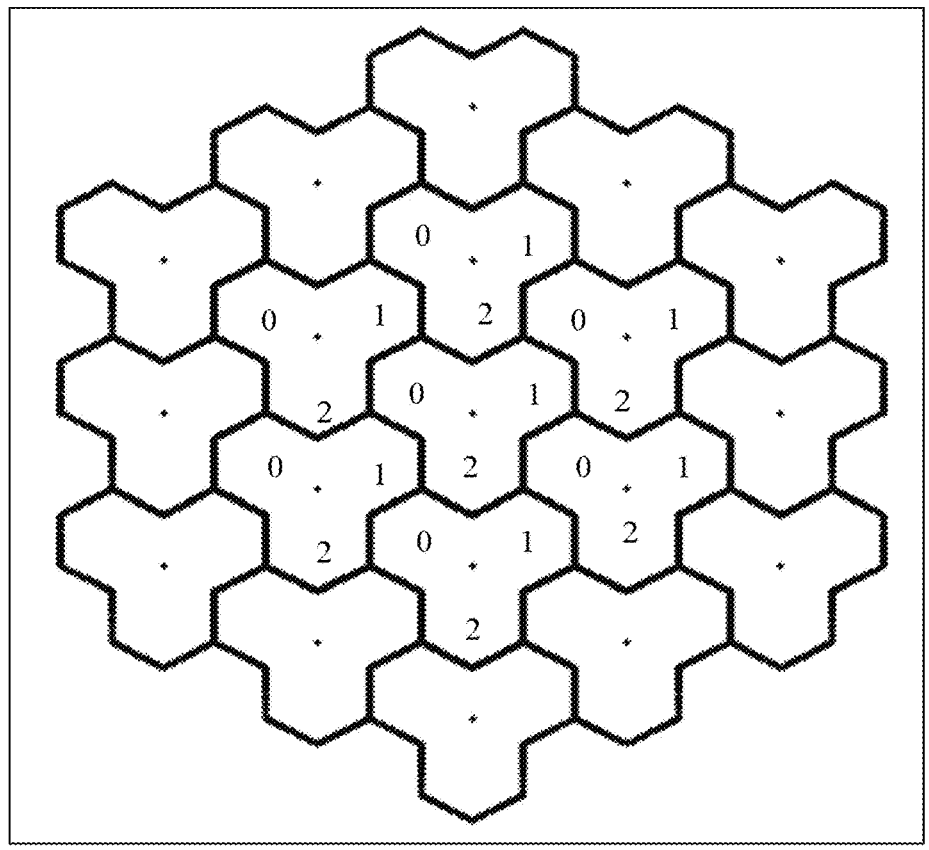
FIG. 6 is a schematic diagram of a spectrum resource configuration according to another embodiment of the present application.

FIG. 6 is a schematic diagram of a spectrum resource configuration according to another embodiment of the present application. Similar to FIG. 5, three hexagons combined together may represent three cellular cells or three sectors controlled by a base station, and numbers 0, 1, and 2 in each cell may correspond to the three frequency band configurations in FIG. 4. As can be seen, frequency band configurations of every two neighboring cells are different, that is, dedicated frequency resources of all cells are staggered; in this way, interference between edge UEs of the neighboring cells is reduced; therefore, a throughput and performance of the edge UE can be further improved.

Figure 7:
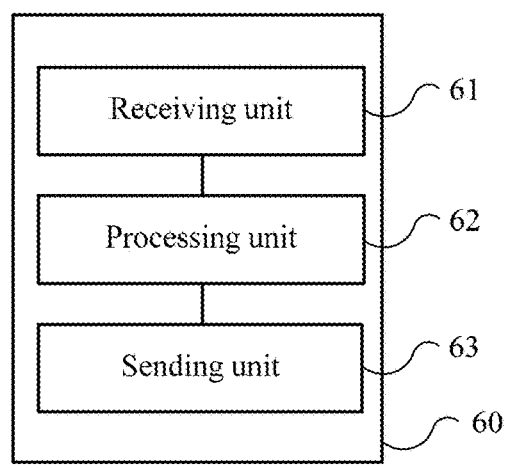
FIG. 7 is a schematic block diagram of a base station according to an embodiment of the present application.

FIG. 7 is a schematic block diagram of a base station according to an embodiment of the present application. The base station 60 in FIG. 7 includes a receiving unit 61, a processing unit 62, and a sending unit 63.

The receiving unit 61 receives a scheduling request from user equipment UE. The processing unit 62 determines a scheduling type of the UE, where the scheduling type is edge UE or non-edge UE. The processing unit 62 schedules a frequency resource for the UE according to the scheduling type of the UE and a frequency resource configuration of a serving cell of the UE, where the frequency resource configuration of the serving cell of the UE includes a public frequency resource and a dedicated frequency resource; virtual multiple-input multiple-output VMIMO pairing is allowed on the public frequency resource, and the public frequency resource is capable of being used to schedule edge UE and non-edge UE; and VMIMO pairing is not allowed on the dedicated frequency resource, and the dedicated frequency resource is capable of being used to schedule only edge UE. The sending unit 63 sends scheduling information to the UE, where the scheduling information is used to indicate a frequency resource scheduled by the base station for the UE.

The base station 60 in this embodiment of the present application determines that a scheduling type of UE is edge UE or non-edge UE, and schedules a resource for the UE according to the scheduling type of the UE and a frequency resource configuration of a serving cell of the UE; therefore, edge UE is preferentially scheduled on a configured dedicated frequency resource, and VMIMO pairing is not performed on the edge UE scheduled on the dedicated frequency resource, thereby improving a throughput and performance of the edge UE while a throughput of an entire VMIMO system is ensured.

First, the UE may send the scheduling request to the base station 60, to request the base station 60 to allocate an uplink time-frequency resource to the UE, so that the UE sends uplink data to the base station 60 by using the allocated uplink time-frequency resource. Specifically, the scheduling request may be from using a physical uplink control channel (PUCCH), a physical uplink shared channel (PUSCH), or another uplink channel. The scheduling request may carry a message field used to instruct the base station 60 to allocate a time-frequency resource to the UE. For example, the scheduling request may be an uplink scheduling request (SR), a radio access request message of the UE, or another uplink message from the UE to the base station 60, which is not limited in the present application.

The frequency resource configuration of the serving cell of the UE is used to indicate that a frequency resource of the serving cell is configured as a dedicated frequency resource and a public frequency resource. The frequency resource configuration may be pre-configured by the base station 60 or an upper-layer network element, and takes effect in a control unit of each cell after the base station 60 or the cell starts working and joins in a network or after settings are adjusted. The frequency resource configuration may also be set by network maintenance personnel for the entire network, some base stations 60, or some cells, which is not limited in the present application.

In an example of the serving cell of the UE, according to the frequency resource configuration, the frequency resource (frequency band) of the serving cell may be configured as the public frequency resource and the dedicated frequency resource. The dedicated frequency resource is a dedicated frequency resource used to schedule only edge UE, and VMIMO pairing is not performed on the edge UE scheduled on the dedicated frequency resource. The public frequency resource is a public frequency resource mainly used to schedule non-edge UE, and when the dedicated frequency resource is fully occupied, the public frequency resource may also be used to schedule the edge UE; VMIMO pairing may be performed on the non-edge UE scheduled on the public frequency resource.

The dedicated frequency resource may be a continuous frequency resource segment, and preferably, is located at either side of the frequency resource of the serving cell of the UE, or located in the middle of the entire frequency band. Optionally, the dedicated frequency resource may also be multiple discontinuous frequency band resource segments, which is not limited in the present application. A frequency band width (a quantity of resource blocks RBs) occupied by the dedicated frequency resource and a location of the dedicated frequency resource on the frequency resource of the serving cell may be pre-configured by the base station 60 or an upper-layer network device that controls the base station 60, that is, a frequency resource is configured.

Optionally, in an embodiment, the dedicated frequency resource is a continuous frequency segment pre-configured in the frequency resource of the serving cell of the UE, and the pre-configured continuous frequency segment includes a highest frequency or a lowest frequency in the frequency resource of the serving cell of the UE.

That is, the dedicated frequency resource may be preferably configured as a frequency band starting from one side of the frequency resource of the serving cell. Specifically, in a direction from the lowest frequency of the entire frequency resource to an intermediate frequency band, a continuous frequency band may be configured as the dedicated frequency resource, and the remaining part is configured as the public frequency resource. Certainly, the configuration may also start from the highest frequency of the entire frequency resource.

With such a configuration manner, the dedicated frequency resource is centralized at one side of the entire frequency band, and has relatively few frequency borders with the public frequency resource; therefore, edge UE scheduled on the dedicated frequency resource and a user scheduled on the public frequency resource are highly isolated, so that interference on the edge UE is reduced as much as possible, which helps improve a throughput and performance of the edge UE.

Optionally, the configuration may start from an intermediate frequency of the frequency resource of the serving cell to two sides of the frequency resource, at least one continuous frequency band may be determined as the dedicated frequency resource, and the remaining frequency bands are determined as the public frequency resource. That is, for the configuration of the dedicated frequency resource, it is also feasible to determine, starting from the intermediate frequency of the entire frequency resource to the two sides, a specified quantity of RBs and configure the RBs as the dedicated frequency resource. The remaining parts at the two sides of the entire frequency resource are configured as the public frequency resource. With such a configuration manner, the dedicated frequency resource is centralized in the middle of the entire frequency band, and has relatively few frequency borders with the public frequency resource; therefore, edge UE scheduled on the dedicated frequency resource and a user scheduled on the public frequency resource are highly isolated, so that interference on the edge UE is reduced as much as possible, which helps improve a throughput and performance of the edge UE.

For multiple neighboring cells, if frequency band configuration manners of the neighboring cells are different, locations of dedicated frequency resources on the entire frequency band are staggered, so that interference between edge UE of the neighboring cells is reduced; therefore, a throughput and performance of the edge UE can further be improved.

For multiple neighboring cells, if frequency band configuration manners of the neighboring cells are the same, locations of dedicated frequency resources on the entire frequency band are aligned, and VMIMO pairing is not performed on edge UE on the aligned dedicated frequency resources. Interference on the edge UE is substantially single-input multiple-output SIMO interference, which is quite low compared with interference caused by high-order VMIMO pairing; therefore, an objective of improving a throughput and performance of the edge UE without affecting a capacity of a VMIMO system can be achieved.

Optionally, in an embodiment, the processing unit 62 is specifically configured to: when the UE is non-edge UE, schedule the frequency resource for the UE only on the public frequency resource. That is, when the scheduling type, determined by the base station 60, of the UE is non-edge UE, the frequency resource indicated by the scheduling information includes only some or all unscheduled resources of the public frequency resource.

When the UE is determined as non-edge UE, the base station 60 schedules the UE on the public frequency resource, and can schedule the UE only on the public frequency resource. Specifically, the base station 60 may allocate some or all unscheduled resources of the public frequency resource to the UE. Moreover, VMIMO pairing may be performed on the UE and another non-edge UE that is scheduled on the public frequency resource. Specifically, algorithms such as a round-robin (RR) algorithm, a proportional fair (PF) algorithm, random pairing, or maximum capacity pairing may be used to pair the non-edge UEs, which is not limited in the present application. The resource scheduled by the base station 60 for the non-edge UE may be delivered to the UE by using the scheduling information.

Optionally, in an embodiment, the processing unit 62 is specifically configured to: when the UE is edge UE, between the public frequency resource and the dedicated frequency resource, schedule the frequency resource for the UE preferentially on the dedicated frequency resource. That is, when the scheduling type, determined by the base station 60, of the UE is edge UE, the frequency resource indicated by the scheduling information includes only some or all unscheduled resources of the dedicated frequency resource; or the frequency resource indicated by the scheduling information includes all unscheduled resources of the dedicated frequency resource and some or all unscheduled resources of the public frequency resource.

When the UE is determined as edge UE, the base station 60 allocates a resource to the edge UE, and if the dedicated frequency resource includes unscheduled resources, allocates some or all unscheduled resources to the edge UE. If the dedicated frequency resource includes no unscheduled resource, that is, all dedicated frequency resources are occupied, a resource from the public frequency resource may be allocated to the edge UE. Moreover, in a case of scheduling the edge UE on the public frequency resource, VMIMO pairing is prohibited from being performed on the edge UE.

Optionally, in an embodiment, the processing unit 62 is specifically configured to: preferentially select, from unscheduled frequency resources of the dedicated frequency resource, a frequency resource with a largest frequency spacing from the public frequency resource. That is, when the frequency resource indicated by the scheduling information includes only some unscheduled resources of the dedicated frequency resource, the frequency resource indicated by the scheduling information includes: a frequency resource, in the unscheduled frequency resources of the dedicated frequency resource, with a largest frequency spacing from the public frequency resource.

When the edge UE is scheduled, a resource may be scheduled for the UE according to a frequency band configuration manner, to further ensure isolation between the edge UE and the non-edge UE during scheduling. Specifically, when the dedicated frequency resource is configured at a highest-frequency side of the entire frequency band, RBs may be allocated to the edge UE starting from the highest-frequency side of the dedicated frequency resource. Correspondingly, for the non-edge UE, RBs may be allocated to the non-edge UE starting from a lowest-frequency side of the public frequency resource. Such a manner of allocating RBs starting from two sides, which are farthest away from each other, of the dedicated frequency resource and the public frequency resource can maximize isolation between the edge UE and the non-edge UE, and can further reduce interference on the edge UE, thereby further improving a throughput and performance of the edge UE.

In addition, before RBs are allocated to the edge UE, whether the dedicated frequency resource includes an unscheduled RB may be first determined. If the dedicated frequency resource includes an unscheduled RB, the edge UE is preferentially scheduled on the dedicated frequency resource, and if a quantity of unscheduled RBs is less than a quantity of RBs required by the edge UE, an RB of the public frequency resource may be allocated to the edge UE by crossing a boundary between the dedicated frequency resource and the public frequency resource, to make up for the shortage of RBs of the dedicated frequency resource. If all RBs of the dedicated frequency resource have been scheduled, RBs of the public frequency resource may be allocated to the edge UE.

Optionally, when it is determined that the dedicated frequency resource includes at least one unscheduled resource block RB, and the dedicated frequency resource includes the lowest frequency of the entire frequency resource, in a direction from the lowest frequency of the dedicated frequency resource to an intermediate frequency of the entire frequency resource, RBs of the dedicated frequency resource are allocated to the UE; or when it is determined that all RBs of the dedicated frequency resource have been scheduled, RBs of the public frequency resource are allocated to the UE.

When scheduling the edge UE, the base station 60 may schedule a resource for the UE according to a frequency band configuration manner, to further ensure isolation between the edge UE and the non-edge UE during scheduling. Specifically, when the dedicated frequency resource is configured at a lowest-frequency side of the entire frequency band, RBs may be allocated to the edge UE starting from the lowest-frequency side of the dedicated frequency resource. Correspondingly, for the non-edge UE, RBs may be allocated to the non-edge UE starting from a highest-frequency side of the public frequency resource. Such a manner of allocating RBs starting from two sides, which are farthest away from each other, of the dedicated frequency resource and the public frequency resource can maximize isolation between the edge UE and the non-edge UE, and can further reduce interference on the edge UE, thereby further improving a throughput and performance of the edge UE.

Optionally, if the dedicated frequency resource is located in the middle of the entire frequency band, when scheduling the edge UE, the base station 60 may allocate RBs to the edge UE starting from any location on the dedicated frequency resource, and when scheduling the non-edge UE, the base station 60 preferentially allocates RBs to the non-edge UE starting from two sides of the entire frequency band, that is, a highest-frequency side and a lowest-frequency side of the public frequency resource.

Optionally, in an embodiment, the processing unit 62 is specifically configured to: when the UE is the edge UE, preferentially select a frequency resource with a maximum signal to interference plus noise ratio SINR from unscheduled resources of the public frequency resource and the dedicated frequency resource. That is, when the scheduling type, determined by the base station 60, of the UE is edge UE, the frequency resource indicated by the scheduling information includes: a frequency resource with a maximum signal to interference plus noise ratio SINR in unscheduled resources of the public frequency resource and the dedicated frequency resource.

The base station 60 may determine an SINR of each RB in the entire frequency resource (the dedicated frequency resource and the public frequency resource), and according to a quantity N of RBs required by the UE, select N RBs having a relatively large sum of SINRs and allocate the N RBs to the UE. Preferably, the N RBs are continuous RBs. That is, a frequency resource that is allocated to the UE and that is indicated by the generated scheduling information is a frequency resource with a maximum SINR in the entire frequency resource.

When RBs are selected according to the SINR to schedule the edge UE, because a better resource is preferentially allocated to edge UE with poor communication quality and strength, an anti-interference capability of the edge UE can be further improved; therefore, a throughput and performance of the edge UE are improved.

Optionally, in an embodiment, the processing unit 62 is configured to: receive an uplink signal from the UE, and determine a signal to interference plus noise ratio SINR of the UE; and when the SINR of the UE is less than a first preset threshold, determine that the UE is edge UE; or when the SINR of the target UE is greater than a first preset threshold, determine that the UE is non-edge UE.

Preferably, whether the UE is edge UE may be determined by measuring an SINR of the UE. The UE may send an uplink access request signal or an uplink synchronization signal to the control base station 60 of the serving cell, so that the control base station 60 of the serving cell determines a signal to interference plus noise ratio SINR of the UE according to the uplink access request signal or the uplink synchronization signal. Specifically, the base station 60 may preset a first threshold, and UE whose SINR is less than the first threshold is determined as edge UE.

It should be understood that, a parameter for measurement and for determining whether the UE is edge UE is not limited to the SINR, and determining may also be performed by using parameters that can indicate UE communication quality, such as a reference signal received power RSRP, reference signal received quality RSRQ, a received signal strength indicator RSSI, and a distance between the UE and the base station 60. Correspondingly, the setting of the first threshold, and settings of a magnitude relationship and a determining result vary with a parameter type. For example, when a measurement parameter is an RSRP, and when a measurement result is less than the first threshold, it is determined that the UE is edge UE; or when a measurement result is greater than the first threshold, it is determined that the UE is non-edge UE. As for a case in which the measurement result is equal to the first threshold, that the UE is edge UE or non-edge UE may be preset. In addition, the parameter for determining whether the UE is edge UE may also be any combination of the foregoing several parameters, which is not limited in the present application.

Optionally, in an embodiment, the processing unit 62 is specifically configured to: receive, by using the receiving unit, a reference signal received power RSRP difference from the UE, where the RSRP difference includes a difference between a receive power of a downlink reference signal in the serving cell of the UE and a receive power of a downlink reference signal in a neighboring cell of the serving cell of the UE; and when an absolute value of the RSRP difference is less than a first preset threshold, determine that the UE is edge UE; or when an absolute value of the RSRP difference is greater than a first preset threshold, determine that the UE is non-edge UE.

Optionally, in an embodiment, the processing unit 62 is specifically configured to: when the SINR of the UE or the absolute value of the RSRP difference is less than a second preset threshold, determine that the UE is protected UE. The scheduling a frequency resource for the UE according to the scheduling type of the UE and a frequency resource configuration of a serving cell of the UE includes: when the UE is protected UE, scheduling the frequency resource for the UE only on the dedicated frequency resource.

After the UE is determined as edge UE, whether the UE is UE that needs to be protected may further be determined, and specifically, may be determined by comparing the measured SINR of the UE or the RSRP difference with the second preset threshold. For the UE that needs to be protected, the base station 60 disables VMIMO pairing for the UE, and restrains a quantity of RBs allocated to the UE to be no greater than a quantity of RBs of the dedicated frequency resource. In this way, it can be ensured that if the UE that needs to be protected is the first scheduled edge UE, the UE that needs to be protected may completely use the dedicated frequency resource, and be free from multiflow VMIMO interference.

Similar to the parameter for determining whether the UE is edge UE, the parameter for measurement and for determining whether the UE is UE that needs to be protected is not limited to the SINR, and determining may also be performed by using parameters that can indicate UE communication quality, such as an RSRP, RSRQ, an RSSI, and a distance between the UE and the base station 60. Correspondingly, the setting of the second threshold, and settings of a magnitude relationship and a determining result vary with a parameter type. For example, when a measurement parameter is an RSRP, and when a measurement result is less than the second threshold, it is determined that the UE is a user that needs to be protected; or when a measurement result is greater than the second threshold, it is determined that the UE is a user that does not need to be protected. As for a case in which the measurement result is equal to the second threshold, that the UE is a user that needs to be protected or a user that does not need to be protected may be preset. In addition, the parameter for determining whether the UE is a user that needs to be protected may also be any combination of the foregoing several parameters, which is not limited in the present application. In addition, the type of the parameter for determining whether the UE is edge UE may be the same as or different from that of the parameter for determining whether the UE is a user that needs to be protected.

The base station 60 in this embodiment of the present application performs frequency band configuration on an entire frequency resource of a cell, so that a user at a cell edge is preferentially scheduled on a configured dedicated frequency resource, and VMIMO pairing is not performed on edge UE scheduled on the dedicated frequency resource; therefore, while a throughput of an entire VMIMO system is ensured, interference from VMIMO paired users in this cell and a neighboring cell on the edge UE is reduced, thereby improving a throughput and performance of the edge UE. Moreover, the dedicated frequency resource may be configured at one side of an entire frequency band in a centralized manner, to reduce frequency borders with a public frequency resource, and further improve isolation between the edge UE on the dedicated frequency resource and a user scheduled on the public frequency resource, so that the interference on the edge UE may be reduced as much as possible. Alternatively, different frequency band configuration manners are used in neighboring cells, so that locations of dedicated frequency resources can be staggered on the entire frequency band, and interference between edge UEs of the neighboring cells is further reduced; therefore, the throughput and performance of the edge UE can be further improved.

Figure 8:
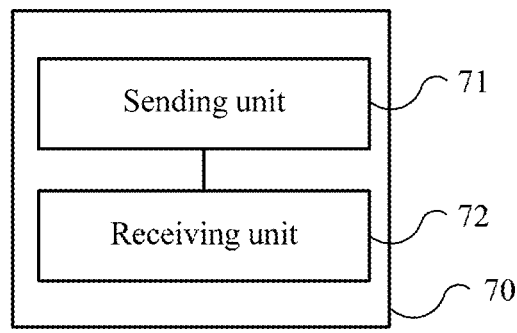
FIG. 8 is a schematic block diagram of user equipment according to an embodiment of the present application.

FIG. 8 is a schematic block diagram of user equipment according to an embodiment of the present application. The user equipment UE 70 in FIG. 8 includes a sending unit 71, and a receiving unit 72.

The sending unit 71 sends a scheduling request to a base station, where the base station is a control base station of a serving cell of the UE, and a scheduling type, determined by the base station, of the UE is edge UE or non-edge UE, where a frequency resource configuration of the serving cell of the UE includes a public frequency resource and a dedicated frequency resource; virtual multiple-input multiple-output VMIMO pairing is allowed on the public frequency resource, and the public frequency resource is capable of being used to schedule edge UE and non-edge UE; and VMIMO pairing is not allowed on the dedicated frequency resource, and the dedicated frequency resource is capable of being used to schedule only edge UE. The receiving unit 72 receives scheduling information from the base station, where the scheduling information is used to indicate a frequency resource scheduled by the base station for the UE.

According to this embodiment of the present application, frequency band configuration is performed on an entire frequency resource of a cell, so that a user at a cell edge is preferentially scheduled on a configured dedicated frequency resource, and VMIMO pairing is not performed on edge UE scheduled on the dedicated frequency resource; therefore, while a throughput of an entire VMIMO system is ensured, interference from VMIMO paired users in this cell and a neighboring cell on the edge UE is reduced, thereby improving a throughput and performance of the edge UE. Moreover, the dedicated frequency resource may be configured at one side of an entire frequency band in a centralized manner, to reduce frequency borders with a public frequency resource, and further improve isolation between the edge UE on the dedicated frequency resource and a user scheduled on the public frequency resource, so that the interference on the edge UE may be reduced as much as possible. Alternatively, different frequency band configuration manners are used in neighboring cells, so that locations of dedicated frequency resources can be staggered on the entire frequency band, and interference between edge UEs of the neighboring cells is further reduced; therefore, the throughput and performance of the edge UE can be further improved.

Figure 9:
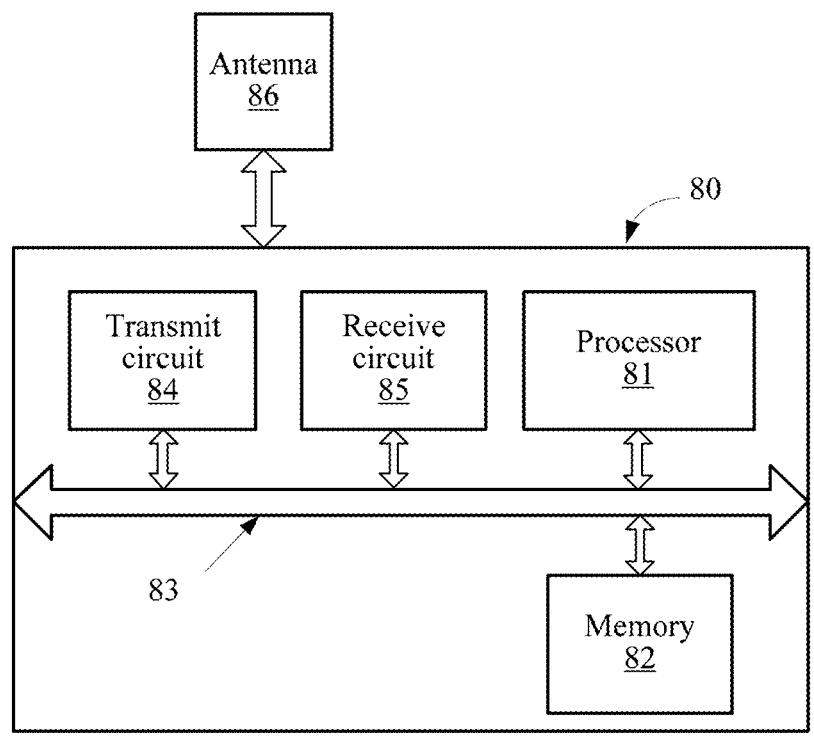
FIG. 9 is a schematic block diagram of a base station according to another embodiment of the present application.

FIG. 9 is a schematic block diagram of a base station according to another embodiment of the present application. The base station 80 in FIG. 9 includes a processor 81 and a memory 82. The processor 81 and the memory 82 are connected by using a bus system 83.

The memory 82 is configured to store an instruction that allows the processor 81 to execute the following operations: receiving a scheduling request from user equipment UE; determining a scheduling type of the UE, where the scheduling type is edge UE or non-edge UE; scheduling a frequency resource for the UE according to the scheduling type of the UE and a frequency resource configuration of a serving cell of the UE; and sending scheduling information to the UE. The scheduling information is used to indicate the frequency resource scheduled by the base station for the UE. The frequency resource configuration of the serving cell of the UE includes a public frequency resource and a dedicated frequency resource; virtual multiple-input multiple-output VMIMO pairing is allowed on the public frequency resource, and the public frequency resource is capable of being used to schedule edge UE and non-edge UE; and VMIMO pairing is not allowed on the dedicated frequency resource, and the dedicated frequency resource is capable of being used to schedule only edge UE.

The base station 80 in this embodiment of the present application determines that a scheduling type of UE is edge UE or non-edge UE, and schedules a resource for the UE according to the scheduling type of the UE and a frequency resource configuration of a serving cell of the UE; therefore, edge UE is preferentially scheduled on a configured dedicated frequency resource, and VMIMO pairing is not performed on the edge UE scheduled on the dedicated frequency resource, thereby improving a throughput and performance of the edge UE while a throughput of an entire VMIMO system is ensured.

In addition, the base station 80 may further include a transmit circuit 84, a receive circuit 85, an antenna 86, and the like. The processor 81 controls an operation of the base station 80, and the processor 81 may also be referred to as a CPU (central processing unit). The memory 82 may include a read-only memory and a random access memory, and provides an instruction and data to the processor 81. A part of the memory 82 may further include a non-volatile random access memory (NVRAM). In a specific application, the transmit circuit 84 and the receive circuit 85 may be coupled to the antenna 86. Components of the base station 80 are coupled together by using the bus system 83. In addition to a data bus, the bus system 83 may further include a power bus, a control bus, a status signal bus, and the like. However, for purpose of clear description, various types of buses in the figure are all marked as the bus system 83.

The methods disclosed in the foregoing embodiments of the present application may be applied to the processor 81, or implemented by the processor 81. The processor 81 may be an integrated circuit chip and has a signal processing capability. In an implementation process, steps of the foregoing methods may be accomplished by using an integrated logic circuit of hardware in the processor 81 or an instruction in a form of software. The processor 81 may be a general purpose processor, a digital signal processor (DSP), an application-specific integrated circuit (ASIC), a field programmable gate array (FPGA), or another programmable logic device, discrete gate or transistor logic device, or discrete hardware component. The processor 81 may implement or execute the methods, steps and logical block diagrams disclosed in the embodiments of the present application. The general purpose processor may be a microprocessor or the processor may be any conventional processor and the like. Steps of the methods disclosed with reference to the embodiments of the present application may be directly executed and completed by a hardware decoding processor, or may be executed and completed by using a combination of hardware and software modules in a decoding processor. The software module may be located in a mature storage medium in the art, such as a random access memory, a flash memory, a read-only memory, a programmable read-only memory, an electrically-erasable programmable memory, or a register. The storage medium is located in the memory 82, and the processor 81 reads information in the memory 82 and completes the steps of the foregoing methods in combination with hardware of the processor 81.

Optionally, in an embodiment, multiple cells further include a second cell, where the second cell is a neighboring cell of the serving cell. The method further includes: determining a third frequency resource and a fourth frequency resource in an entire frequency resource of the second cell, where VMIMO pairing for the UE is not allowed on the third frequency resource, VMIMO pairing for the UE is allowed on the fourth frequency resource, the third frequency resource is different from the dedicated frequency resource, and the fourth frequency resource is different from the public frequency resource.

Optionally, in an embodiment, the processor 81 is configured to: when the UE is non-edge UE, schedule the frequency resource for the UE only on the public frequency resource.

Optionally, in an embodiment, the processor 81 is configured to: when the UE is edge UE, between the public frequency resource and the dedicated frequency resource, schedule the frequency resource for the UE preferentially on the dedicated frequency resource.

Optionally, in an embodiment, the processor 81 is configured to: preferentially select, from unscheduled frequency resources of the dedicated frequency resource, a frequency resource with a largest frequency spacing from the public frequency resource.

Optionally, in an embodiment, the processor 81 is configured to: when the UE is the edge UE, preferentially select a frequency resource with a maximum signal to interference plus noise ratio SINR from unscheduled resources of the public frequency resource and the dedicated frequency resource.

Optionally, in an embodiment, the processor 81 is configured to: receive, by using the receive circuit, an uplink signal from the UE, and determine a signal to interference plus noise ratio SINR of the UE; and when the SINR of the UE is less than a first preset threshold, determine that the UE is edge UE; or when the SINR of the target UE is greater than a first preset threshold, determine that the UE is non-edge UE.

Optionally, in an embodiment, the processor 81 is configured to: receive a reference signal received power RSRP difference from the UE, where the RSRP difference includes a difference between a receive power of a downlink reference signal in the serving cell of the UE and a receive power of a downlink reference signal in a neighboring cell of the serving cell of the UE; and when an absolute value of the RSRP difference is less than a first preset threshold, determine that the UE is edge UE; or when an absolute value of the RSRP difference is greater than a first preset threshold, determine that the UE is non-edge UE.

Optionally, in an embodiment, the dedicated frequency resource is a continuous frequency segment pre-configured in a frequency resource of the serving cell of the UE, and the pre-configured continuous frequency segment includes a highest frequency or a lowest frequency in the frequency resource of the serving cell of the UE.

The base station 80 in this embodiment of the present application performs frequency band configuration on an entire frequency resource of a cell, so that a user at a cell edge is preferentially scheduled on a configured dedicated frequency resource, and VMIMO pairing is not performed on edge UE scheduled on the dedicated frequency resource; therefore, while a throughput of an entire VMIMO system is ensured, interference from VMIMO paired users in this cell and a neighboring cell on the edge UE is reduced, thereby improving a throughput and performance of the edge UE. Moreover, the dedicated frequency resource may be configured at one side of an entire frequency band in a centralized manner, to reduce frequency borders with a public frequency resource, and further improve isolation between the edge UE on the dedicated frequency resource and a user scheduled on the public frequency resource, so that the interference on the edge UE may be reduced as much as possible. Alternatively, different frequency band configuration manners are used in neighboring cells, so that locations of dedicated frequency resources can be staggered on the entire frequency band, and interference between edge UEs of the neighboring cells is further reduced; therefore, the throughput and performance of the edge UE can be further improved.

Figure 10:
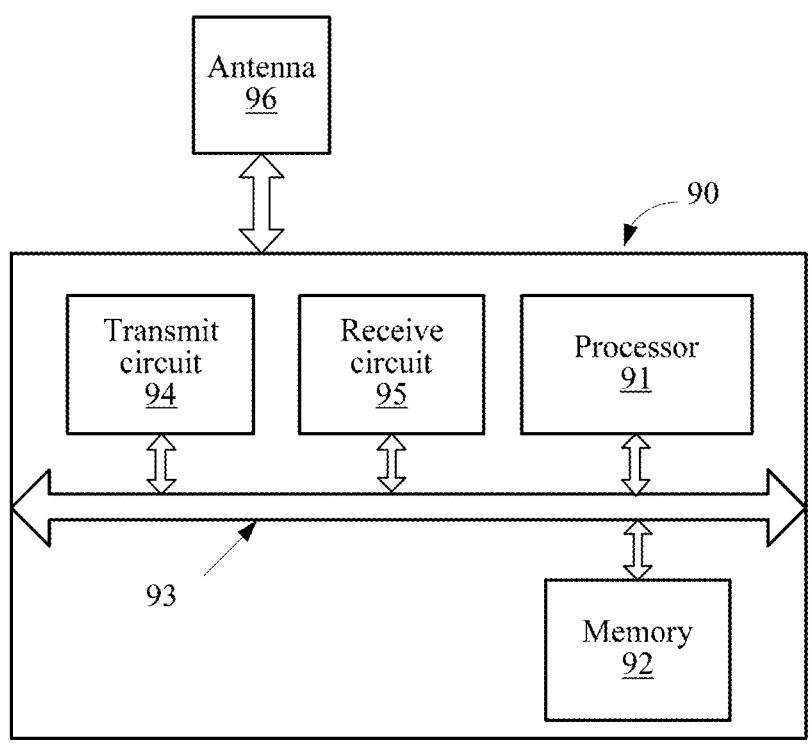
FIG. 10 is a schematic block diagram of user equipment according to another embodiment of the present application.

FIG. 10 is a schematic block diagram of user equipment according to another embodiment of the present application. The user equipment 90 in FIG. 10 includes a processor 91 and a memory 92. The processor 91 and the memory 92 are connected by using a bus system 93.

The memory 92 is configured to store an instruction that allows the processor 91 to execute the following operations: sending a scheduling request to a base station, where the base station is a control base station of a serving cell of the UE 90, a scheduling type, determined by the base station, of the UE 90 is edge UE 90 or non-edge UE 90, a frequency resource configuration of the serving cell of the UE 90 includes a public frequency resource and a dedicated frequency resource, virtual multiple-input multiple-output VMIMO pairing is allowed on the public frequency resource, and the public frequency resource is capable of being used to schedule edge UE 90 and non-edge UE 90, VMIMO pairing is not allowed on the dedicated frequency resource, and the dedicated frequency resource is capable of being used to schedule only edge UE 90; and receiving scheduling information from the base station, where the scheduling information is used to indicate a frequency resource scheduled by the base station for the UE 90.

In addition, the user equipment 90 may further include a transmit circuit 94, a receive circuit 95, an antenna 96, and the like. The processor 91 controls an operation of the user equipment 90, and the processor 91 may also be referred to as a CPU (central processing unit). The memory 92 may include a read-only memory and a random access memory, and provides an instruction and data to the processor 91. A part of the memory 92 may further include a non-volatile random access memory (NVRAM). In a specific application, the transmit circuit 94 and the receive circuit 95 may be coupled to the antenna 96. Components of the user equipment 90 are coupled together by using the bus system 93. In addition to a data bus, the bus system 93 may further include a power bus, a control bus, a status signal bus, and the like. However, for purpose of clear description, various types of buses in the figure are all marked as the bus system 93.

The methods disclosed in the foregoing embodiments of the present application may be applied to the processor 91, or implemented by the processor 91. The processor 91 may be an integrated circuit chip and has a signal processing capability. In an implementation process, steps of the foregoing methods may be accomplished by using an integrated logic circuit of hardware in the processor 91 or an instruction in a form of software. The processor 91 may be a general purpose processor, a digital signal processor (DSP), an application-specific integrated circuit (ASIC), a field programmable gate array (FPGA), or another programmable logic device, discrete gate or transistor logic device, or discrete hardware component. The processor 91 may implement or execute the methods, steps and logical block diagrams disclosed in the embodiments of the present application. The general purpose processor may be a microprocessor or the processor may be any conventional processor and the like. Steps of the methods disclosed with reference to the embodiments of the present application may be directly executed and completed by a hardware decoding processor, or may be executed and completed by using a combination of hardware and software modules in a decoding processor. The software module may be located in a mature storage medium in the art, such as a random access memory, a flash memory, a read-only memory, a programmable read-only memory, an electrically-erasable programmable memory, or a register. The storage medium is located in the memory 92, and the processor 91 reads information in the memory 92 and completes the steps of the foregoing methods in combination with hardware of the processor 91.

Optionally, in an embodiment, when the scheduling type, determined by the base station, of the UE 90 is non-edge UE 90, the frequency resource indicated by the scheduling information includes only some or all unscheduled resources of the public frequency resource.

Optionally, in an embodiment, when the scheduling type, determined by the base station, of the UE 90 is edge UE 90, the frequency resource indicated by the scheduling information includes only some or all unscheduled resources of the dedicated frequency resource; or the frequency resource indicated by the scheduling information includes all unscheduled resources of the dedicated frequency resource and some or all unscheduled resources of the public frequency resource.

Optionally, in an embodiment, when the frequency resource indicated by the scheduling information includes only some unscheduled resources of the dedicated frequency resource, the frequency resource indicated by the scheduling information includes: a frequency resource, in the unscheduled frequency resources of the dedicated frequency resource, with a largest frequency spacing from the public frequency resource.

Optionally, in an embodiment, when the scheduling type, determined by the base station, of the UE 90 is edge UE 90, the frequency resource indicated by the scheduling information includes: a frequency resource with a maximum signal to interference plus noise ratio SINR in unscheduled resources of the public frequency resource and the dedicated frequency resource.

Optionally, in an embodiment, an uplink reference signal is sent to the base station, where the uplink reference signal is used by the base station to determine a signal to interference plus noise ratio SINR of the UE 90; or a reference signal received power RSRP difference is sent to the base station, where the RSRP difference includes a difference between a receive power of a downlink reference signal in the serving cell of the UE 90 and a receive power of a downlink reference signal in a neighboring cell of the serving cell of the UE 90. The signal to interference plus noise ratio SINR of the UE 90 or the RSRP difference is used by the base station to determine that the UE 90 is edge UE 90 or non-edge UE 90.

Optionally, in an embodiment, the dedicated frequency resource is a continuous frequency segment pre-configured in a frequency resource of the serving cell of the UE 90, and the pre-configured continuous frequency segment includes a highest frequency or a lowest frequency in the frequency resource of the serving cell of the UE 90.

According to this embodiment of the present application, frequency band configuration is performed on an entire frequency resource of a cell, so that a user at a cell edge is preferentially scheduled on a configured dedicated frequency resource, and VMIMO pairing is not performed on edge UE 90 scheduled on the dedicated frequency resource; therefore, while a throughput of an entire VMIMO system is ensured, interference from VMIMO paired users in this cell and a neighboring cell on the edge UE 90 is reduced, thereby improving a throughput and performance of the edge UE 90. Moreover, the dedicated frequency resource may be configured at one side of an entire frequency band in a centralized manner, to reduce frequency borders with a public frequency resource, and further improve isolation between the edge UE 90 on the dedicated frequency resource and a user scheduled on the public frequency resource, so that the interference on the edge UE 90 may be reduced as much as possible. Alternatively, different frequency band configuration manners are used in neighboring cells, so that locations of dedicated frequency resources can be staggered on the entire frequency band, and interference between edge UEs 90 of the neighboring cells is further reduced; therefore, the throughput and performance of the edge UE 90 can be further improved.

It should be understood that the term "and/or" in the specification describes only an association relationship for describing associated objects and represents that three relationships may exist. For example, A and/or B may represent the following three cases: Only A exists, both A and B exist, and only B exists. In addition, the character "/" in the specification generally indicates an "or" relationship between the associated objects.

It should be understood that sequence numbers of the foregoing processes do not mean executing sequences in the embodiments of the present application. The executing sequences of the processes shall be determined according to functions and internal logic of the processes, but shall not constitute any limitation to the implementation processes of the embodiments of the present application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is only exemplary. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are only specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A resource scheduling method, comprising:
   receiving, by a base station, a scheduling request from a user equipment (UE);
   determining, by the base station, a scheduling type of the UE, wherein the scheduling type is edge UE or non-edge UE;
   scheduling, by the base station, a frequency resource for the UE according to the scheduling type of the UE and a frequency resource configuration of a serving cell of the UE; and
   sending, by the base station, scheduling information to the UE, wherein the scheduling information is used to indicate the frequency resource scheduled for the UE,
   wherein the frequency resource configuration of the serving cell of the UE comprises a public frequency resource and a dedicated frequency resource;
   wherein virtual multiple-input multiple-output (VMIMO) pairing is allowed on the public frequency resource, and the public frequency resource is capable of being used to schedule UEs having scheduling type edge UE and non-edge UE; and
   wherein VMIMO pairing is not allowed on the dedicated frequency resource, and the dedicated frequency resource is capable of being used to schedule UEs having scheduling type edge UE and is not capable of being used to schedule UEs having scheduling type non-edge UE.

2. The method according to claim 1, wherein the scheduling type of the UE is non-edge UE, and wherein the scheduling, by the base station, the frequency resource for the UE comprises:
   scheduling the frequency resource for the UE on the public frequency resource and not schedule the frequency resource for the UE on the dedicated frequency resource.

3. The method according to claim 1, wherein the scheduling type of the UE is edge UE, and wherein the scheduling, by the base station, the frequency resource for the UE comprises:
   scheduling the frequency resource for the UE between the dedicated frequency resource and the public frequency resource, wherein scheduling the frequency resource for the UE is preferentially scheduled on the dedicated frequency resource.

4. The method according to claim 3, wherein the scheduling the frequency resource for the UE further comprises:
   preferentially selecting, from unscheduled frequency resources of the dedicated frequency resource, a frequency resource with a largest frequency spacing from the public frequency resource.

5. The method according to claim 1, wherein the scheduling type of the UE is edge UE, and wherein the scheduling, by the base station, the frequency resource for the UE comprises:
   preferentially selecting a frequency resource with a maximum signal to interference plus noise ratio (SINR) from unscheduled resources of the public frequency resource and the dedicated frequency resource.

6. The method according to claim 1, wherein the determining, by the base station, the scheduling type of the UE comprises:
   receiving an uplink signal from the UE, and determining a signal to interference plus noise ratio (SINR) of the UE; and
   when the SINR of the UE is less than a first preset threshold, determining that the scheduling type of the UE is edge UE, and when the SINR of the UE is greater than a first preset threshold, determining that the scheduling type of the UE is non-edge UE.

7. The method according to claim 1, wherein the determining, by the base station, the scheduling type of the UE comprises:

receiving a reference signal received power (RSRP) difference from the UE, wherein the RSRP difference comprises a difference between a receive power of a downlink reference signal in the serving cell of the UE and a receive power of a downlink reference signal in a neighboring cell of the serving cell of the UE; and when an absolute value of the RSRP difference is less than a first preset threshold, determining that the scheduling type of the UE is edge UE, and when an absolute value of the RSRP difference is greater than a first preset threshold, determining that the scheduling type of the UE is non-edge UE.

8. The method according to claim 1, wherein:

the dedicated frequency resource is a continuous frequency segment pre-configured in a frequency resource of the serving cell of the UE; and the continuous frequency segment comprises a highest frequency or a lowest frequency in the frequency resource of the serving cell of the UE.

9. A base station, comprising:

a memory storing instructions; and a processor configured to execute the instructions to:
  receive a scheduling request from a user equipment (UE);
  determine a scheduling type of the UE, wherein the scheduling type is edge UE or non-edge UE;
  schedule a frequency resource for the UE according to the scheduling type of the UE and a frequency resource configuration of a serving cell of the UE; and
  send scheduling information to the UE,
  wherein the scheduling information is used to indicate the frequency resource scheduled for the UE,
  wherein the frequency resource configuration of the serving cell of the UE comprises a public frequency resource and a dedicated frequency resource;
  wherein virtual multiple-input multiple-output (VMIMO) pairing is allowed on the public frequency resource, and the public frequency resource is capable of being used to schedule UEs having scheduling type edge UE and non-edge UE; and
  wherein VMIMO pairing is not allowed on the dedicated frequency resource, and the dedicated frequency resource is capable of being used to schedule UEs having scheduling type edge UE and is not capable of being used to schedule UEs having scheduling type non-edge UE.

10. The base station according to claim 9, wherein the scheduling type of the UE is non-edge UE, and wherein the processor is further configured to:
  schedule the frequency resource for the UE on the public frequency resource and not schedule the frequency resource for the UE on the dedicated frequency resource.

11. The base station according to claim 9, wherein the scheduling type of the UE is edge UE, and wherein the processor is further configured to:
  schedule the frequency resource for the UE between the dedicated frequency resource and the public frequency resource, wherein scheduling the frequency resource for the UE is preferentially scheduled on the dedicated frequency resource.

12. The base station according to claim 11, wherein the processor is further configured to:
  preferentially select, from unscheduled frequency resources of the dedicated frequency resource, a frequency resource with a largest frequency spacing from the public frequency resource.

13. The base station according to claim 9, wherein the scheduling type of the UE is edge UE, and wherein the processor is further configured to:
  preferentially select a frequency resource with a maximum signal to interference plus noise ratio (SINR) from unscheduled resources of the public frequency resource and the dedicated frequency resource.

14. The base station according to claim 9, wherein the processor is further configured to:
  receive an uplink signal from the UE, and determine a signal to interference plus noise ratio (SINR) of the UE; and
  when the SINR of the UE is less than a first preset threshold, determine that the scheduling type of the UE is edge UE, and when the SINR of the target UE is greater than a first preset threshold, determine that the scheduling type of the UE is non-edge UE.

15. The base station according to claim 9, wherein the processor is further configured to:
  receive a reference signal received power (RSRP) difference from the UE, wherein the RSRP difference comprises a difference between a receive power of a downlink reference signal in the serving cell of the UE and a receive power of a downlink reference signal in a neighboring cell of the serving cell of the UE; and
  when an absolute value of the RSRP difference is less than a first preset threshold, determine that the scheduling type of the UE is edge UE, and when an absolute value of the RSRP difference is greater than a first preset threshold, determine that the scheduling type of the UE is non-edge UE.

16. The base station according to claim 9, wherein:

the dedicated frequency resource is a continuous frequency segment pre-configured in a frequency resource of the serving cell of the UE; and the continuous frequency segment comprises a highest frequency or a lowest frequency in the frequency resource of the serving cell of the UE.

* * * * *